(12) United States Patent
Patel et al.

(10) Patent No.: US 12,081,912 B1
(45) Date of Patent: Sep. 3, 2024

(54) MONITORING/ALERT SYSTEM FOR AIRLINE GATE ACTIVITIES

(71) Applicant: AMERICAN AIRLINES, INC., Fort Worth, TX (US)

(72) Inventors: Krunalkumar Patel, Irving, TX (US); Murali Ande, Flower Mound, TX (US); James Hill, Fort Worth, TX (US)

(73) Assignee: AMERICAN AIRLINES, INC., Fort Worth, TX (US)

( * ) Notice: Subject to any disclaimer, the term of this patent is extended or adjusted under 35 U.S.C. 154(b) by 0 days.

(21) Appl. No.: 18/487,400

(22) Filed: Oct. 16, 2023

Related U.S. Application Data

(63) Continuation of application No. 17/316,245, filed on May 10, 2021, now Pat. No. 11,792,369, which is a continuation of application No. 16/599,869, filed on Oct. 11, 2019, now Pat. No. 11,006,078.

(60) Provisional application No. 62/744,931, filed on Oct. 12, 2018.

(51) Int. Cl.
| | |
|---|---|
| *H04N 7/18* | (2006.01) |
| *G06Q 10/1093* | (2023.01) |
| *G06T 7/62* | (2017.01) |
| *G06V 20/52* | (2022.01) |
| *H04N 23/90* | (2023.01) |

(52) U.S. Cl.
CPC ......... *H04N 7/181* (2013.01); *G06Q 10/1097* (2013.01); *G06T 7/62* (2017.01); *G06V 20/52* (2022.01); *H04N 23/90* (2023.01); *G06T 2207/30112* (2013.01); *G06T 2207/30196* (2013.01); *G06T 2207/30232* (2013.01)

(58) Field of Classification Search
CPC .... H04N 7/181; H04N 23/90; G06Q 10/1097; G06T 7/62; G06T 2207/30112; G06T 2207/30196; G06T 2207/30232; G06V 20/52
See application file for complete search history.

(56) References Cited

U.S. PATENT DOCUMENTS

| | | | | |
|---|---|---|---|---|
| 2017/0004384 | A1* | 1/2017 | Audo | G06V 20/52 |
| 2017/0320437 | A1* | 11/2017 | Liebau | G01C 11/06 |
| 2019/0233113 | A1* | 8/2019 | Carswell | G06T 7/62 |

* cited by examiner

*Primary Examiner* — Michael E Teitelbaum
(74) *Attorney, Agent, or Firm* — HAYNES AND BOONE, LLP

(57) ABSTRACT

A method of monitoring and reporting aircraft turnaround activities at an airport gate that includes monitoring the airport gate using a first camera that has a first field of view associated with the airport gate; generating, using the first camera, first image data capturing a first activity within the first field of view; receiving, by processor(s), the first image data; identifying, by the processor(s), the first activity captured in the first image data; comparing, using a computer application, aspect(s) of the first activity with a predetermined schedule; and displaying, on a graphical user interface remote from the first camera and using the computer application, an alert indicating that the first activity does not comply with the predetermined schedule; wherein the processor(s) include a machine learning processor.

20 Claims, 15 Drawing Sheets

GET | Next Gen  |  Search Flight/Gate

DFW ⟷ SCH
Eagle 1, Eagle 2, Ea...

| All | ✈ | 🛬 | ✈ | 🔧 | ⚙ | 🌙 | ✈ | 👤 | ⚠ | ✈ | 💡 | 🚪 | ⊕ | ○ |
|---|---|---|---|---|---|---|---|---|---|---|---|---|---|---|
| 261 | 2 | 10 | 7 | 0 | 63 | 4 | 22 | 118 | 4 | 38 | 26 | 5 | 12 | 4 | 4 | 6 | 0 |

Hybrid View — Past 6 hours to next 2 hours - Total Gates

| | 15 | 45 | 7:00 | 15 | 45 | 8:00 | 15 | 45 |

D6
D7
D15
D16
B1 — LRD/E145 IN 07:23:2... — 4095/ TER... — 681/ZCL SKD 10:43 — AGU/E145 IN 08:15 7E — 135a, 135b
B2 — LCH/E145 IN 07:38 4L — 3540 / 3848 — 3687 / 3966
B3 — 150 — MTY/E75E IN 07:31 26E — 671/AEX OUT 08:39 6E 135d, 145, 135f, 155

ARRIVAL FLIGHT DETAILS
| Gte | Ft.No | Org | Status | LAT | EQ. TYPE | TAIL | Gte | Ft. No |
|---|---|---|---|---|---|---|---|---|
| A38 | 0437 | ORD | IN | 22:59/20 (-16) | A321 | 171 | A38 | 0536 |
| B32 | 3351 | SPI | IN | 08:06 (-5) | E145 | 662 | B32 | 3506 |
| A8 | 2237 | DCA | IN | 22:09/20 (-29) | 321S | 909 | A8 | 1112 |
| A20 | 2362 | FAT | IN | 11:23/20 (+5) | 738A | 3MC | A15 | 2310 |
| B35 | 5788 | GPT | IN | 07:42 (-9) | R9MJ | 917 | B35 | 5853 |

DEPARTURE FLIGHT DETAILS
| Dest | LOT | Status | ETO Code |
|---|---|---|---|
| LAS | 08:56 (-4) | OUT | |
| TXK | 09:00 | SKD | |
| LGA | 08:56 (-4) | OUT | |
| CZM | 09:00 (+10) | ETD | ACS |
| LFT | 09:00 | SKD | |

Fig. 4B

FROM FIG. 6A

MONITORING/ALERT SYSTEM FOR AIRLINE GATE ACTIVITIES

CROSS-REFERENCE TO RELATED APPLICATIONS

This application is a continuation of U.S. application Ser. No. 17/316,245, filed May 10, 2021, which is a continuation of U.S. application Ser. No. 16/599,869, filed Oct. 11, 2019, issued as U.S. Pat. No. 11,006,078, which claims the benefit of the filing date of, and priority to, U.S. Application No. 62/744,931, filed Oct. 12, 2018, the entire disclosures of which are hereby incorporated herein by reference.

BACKGROUND

One aircraft is often used for multiple flights each day. As such, when the aircraft completes one flight, the aircraft is then readied for the next flight. This process is often referred to as gate turnaround and the amount of time required to deplane, board the plane, and prepare the aircraft for departure is referred to as turnaround time. The gate turnaround process occurs at a gate of a terminal. With gate availability often being limited, if the gate turnaround time exceeds a scheduled amount of time, then flight delays can result for the turnaround flight and other downstream flights. A gate turnaround involves multiple activities completed by a wide variety of entities. For example, the aircraft must be refueled by a fuel provider, the aircraft must be cleaned by a cleaning crew, the catering must be loaded, the waste must be unloaded, the passengers must deplane, and new passengers board, among other activities. Some activities are dependent upon the completion of another activity. For example, the passengers must deplane before the new passengers are boarded. As such, delays to the completion of one activity can cause delays to "downstream" activities.

Conventionally, each entity manually reports the status of the activity to which they are assigned, and the reports cannot be verified or traced. Some systems attempted to integrate the vendors and entities to drive common situational awareness, but dependence upon self-reporting results in delayed, erroneous, and/or missing status reports. The time required to self-report can also delay the activity itself. For example, when a fuel provider must self-report that he or she has arrived at the gate but not yet started fueling, the self-reporting of the arrival can delay the start of fueling. As such, the turnaround time often exceeds the scheduled time and the ability to evaluate the performance of each entity is lost.

Managing the dispatch, receipt, and storage of the self-reported status reports is difficult and requires an amount of computer processing and computer memory. Reporting downstream delays or updating other applications of the downstream delays is also not easy, considering the update may be in one format and the other application needed to be updated of the delay only receives information or updates in another format. Even when the formats are the same, the update may need to be manually loaded into the application instead of seamlessly integrated into the other application.

BRIEF DESCRIPTION OF THE DRAWINGS

FIGS. 4A and 4B together form an illustration of a window displayed on the GUI of the computer of FIG. 1, according to an example embodiment.

DETAILED DESCRIPTION

Figure 1:
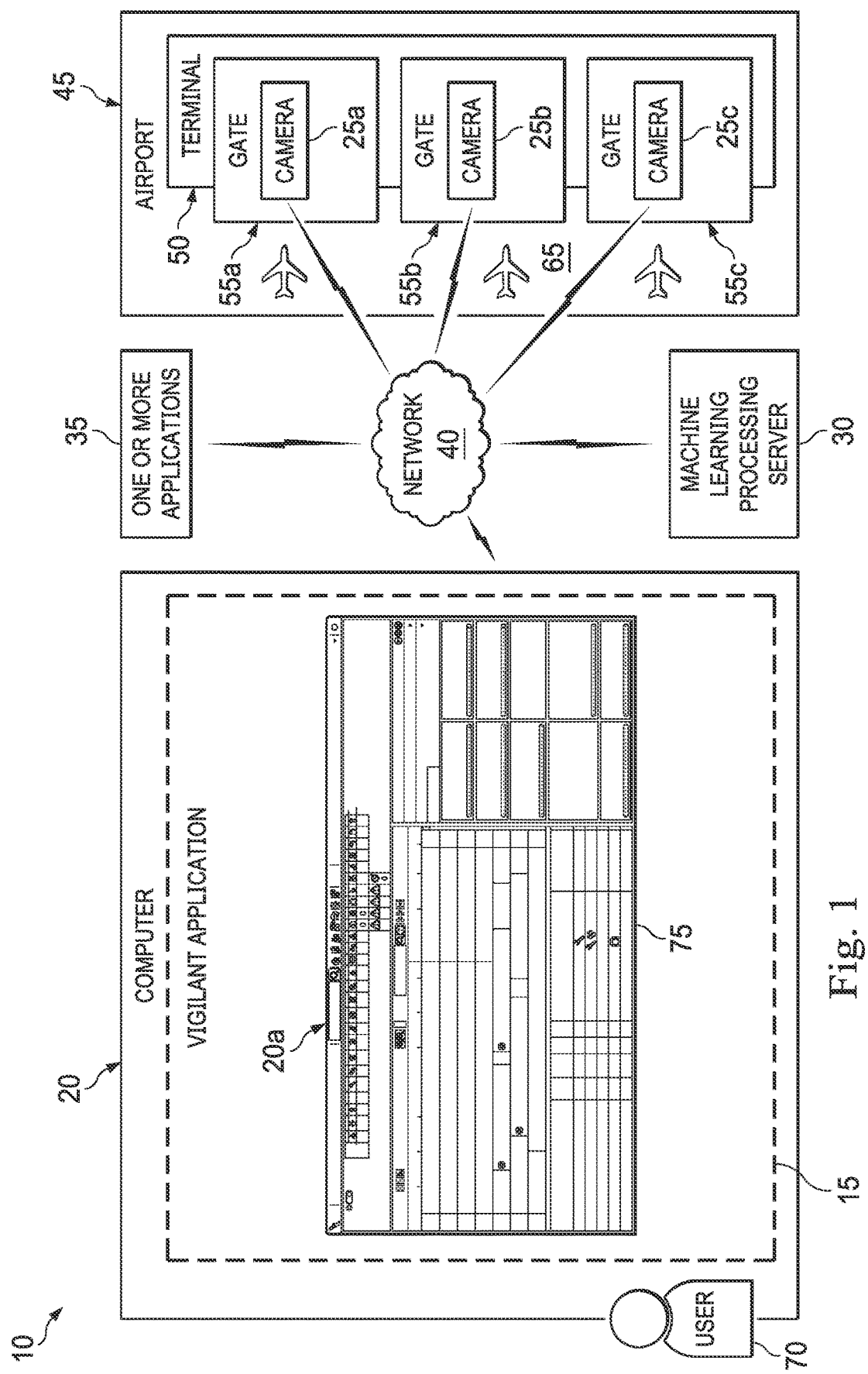
FIG. 1 is a diagrammatic illustration of a gate monitoring system according to an example embodiment, the system including a camera positioned within a gate and a computer comprising a graphical user interface ("GUI") that is configured to display a plurality of windows.

The following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

In an example embodiment, as illustrated in FIG. 1, a system is generally referred to by the reference numeral 10 and includes a vigilant computer application 15, a computer 20 within which at least a portion of the application 15 stored; a plurality of cameras such as camera 25a, 25b, and 25c; a machine learning processing server 30; and one or more applications 35, all of which are operably connected via a network 40. Generally, the cameras 25a, 25b, and 25c are positioned within an airport 45 that includes a terminal 50. The terminal 50 includes gates, such as gates 55a, 55b, and 55c. A gate includes an internal portion of the terminal 50, a jet bridge 60 (illustrated in FIG. 2), and a portion external to the terminal such as a portion of an airport apron 65. Generally, the airport apron 65, ramp, or tarmac, is the area of the airport 45 in which aircraft are parked, unloaded, loaded, refueled, and/or boarded. In some embodiments, the camera 25a is positioned in or near the gate 55a, the camera 25b is positioned in or near the gate 55b, and the camera 25c is positioned in or near the gate 55c. Generally, the system 10 uses the cameras 25a-25c and the machine learning processing server 30 to track the status of activities occurring at the gates 55a-55c during a gate turnaround. The vigilant application 15 provides real-time alerts to a user 70 to mitigate downstream delays and seamlessly integrates updates into other applications (e.g., the one or more applications 35). The application 15 causes a screen 75 to be displayed on a GUI 20a of the computer 20. The screen 75 displays, based on data from the camera 25a, the status of the turnaround for an aircraft that is at the gate 55a and that is undergoing a turnaround. While only one computer 20 is illustrated in FIG. 1, the system 10 generally includes a plurality of computers. For example, in some embodiments the computer 20 is a remote user device and a user is associated with the remote user device. In some embodiments, and when the computer 20 is a remote user device, the application 15 displays a mobile application on the GUI 20a and when the computer 20 is a desktop computer, the application 15 displays a desktop application on the GUI 20a. Often, each person or entity associated with turnaround activities is associated with at least one computer 20. As such, the system 10 includes a plurality of computers, both remote user device and desktop computers, with each computer being associated with a user or entity associated with turnaround activities.

Figure 2:
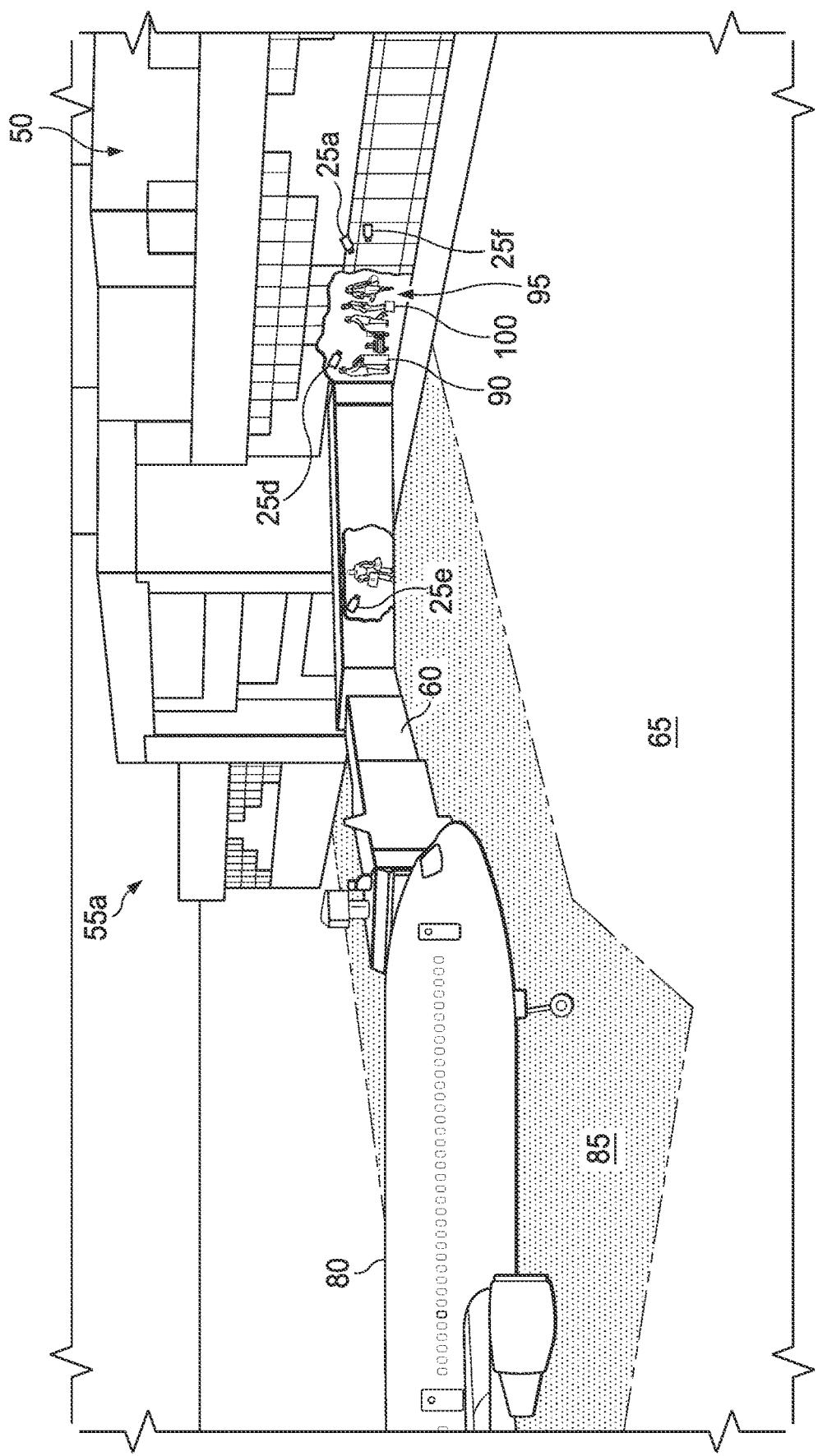
FIG. 2 is a perspective illustration of the gate of FIG. 1, according to an example embodiment.

In an example embodiment, as illustrated in FIG. 2 with continuing reference to FIG. 1, an aircraft 80 is positioned within a safety zone 85 of the airport apron 65. The jet bridge 60 extends from the terminal 50 and is coupled to the aircraft 80. An interior portion of the terminal 50 is associated with the jet bridge 60 and generally includes a desk 90 or other structure for airline employees and a portion or an area 95 through which passengers pass to enter the jet bridge 60. Generally, passengers form a line within the area 95 to prepare to enter the jet bridge 60 and the aircraft 80. Each passenger displays his or her ticket or boarding pass at the desk 90 or other structure to obtain permission to board the aircraft 80. In one embodiment, a camera 25d is positioned such that the field of view includes the area 95 and is capable of viewing the passengers as they prepare to enter the jet bridge 60. In some embodiments, the camera 25d is positioned to view carry-on luggage 100 associated with a passenger within the area 95. In some embodiments, a camera 25e is positioned within the gate 55a such that the field of view includes an interior portion of the jet bridge 60 and carry-on luggage associated with a passenger within the jet bridge 60. As such, the cameras 25d and 25e are positioned such that the field of view includes areas in which passengers pass through or by to board the aircraft 80 (e.g., the jet bridge 60, the area 95, the desk 90). Generally, the camera 25a is positioned such that the field of view includes the safety zone 85 and the aircraft 80 when the aircraft is approaching, parked within, and departing the safety zone 85. In some embodiments, a camera 25f is positioned such that the field of view includes the safety zone 85 and the aircraft when the aircraft is approaching, parked within, and departing the safety zone 85. Any activities performed within the safety zone 85 are also within the field of view of the camera 25a and/or 25f. In some embodiments, the camera 25a and/or camera 25f is coupled or mounted to the terminal 50 but can be coupled to a variety of structures. In several example embodiments, the cameras 25a and 25d-25f are mounted on the airport terminal building at the gate 55a, on or within the jet bridge 60, a pole, one or more other structures, or any combination thereof. The cameras associated with the gate 55a (e.g., 25a and 25d-25f) are in communication with the application 15 and/or the server 30 and, using the machine learning processing server 30, identify and report on the activities occurring within the gate 55a. In some embodiments, a perimeter of the safety zone 85 is defined by permanent or temporary markings on the ground or surface of the apron 65. In some embodiments, the safety zone 85 is generally sized to accommodate the parked aircraft 85 and allow spacing between the aircraft 85 and a perimeter of the safety zone 85. In some embodiments, the perimeter of the safety zone 85 is not marked with visible markings on the ground or surface of the apron 65. In some embodiments, specific rules apply to activities within the safety zone 85. For example, walking and driving speeds are reduced or limited within the safety zone 85. In some embodiments, the perimeter of the safety zone 85 is dependent upon the placement of the aircraft 85. That is and in some embodiments, the safety zone 85 is defined by an imaginary line running around the aircraft 85 at a predetermined distance from the aircraft 80 (e.g., 4 meters from the tip of the wings, nose, and tail of the aircraft) and only vehicles and equipment that may be parked in this area are those required for ground handling and technical maintenance of the aircraft 85.

Figure 3:
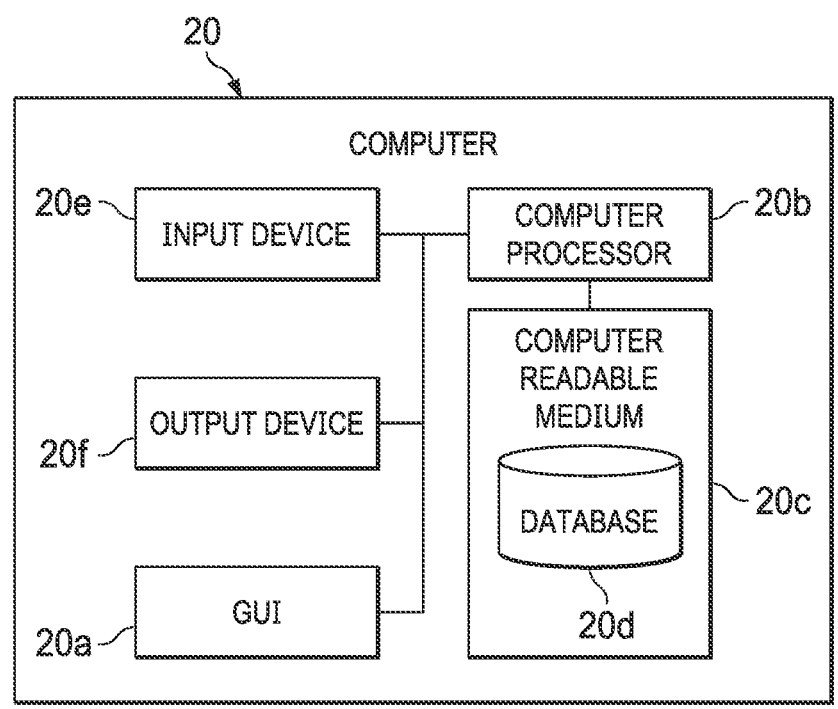
FIG. 3 is a diagrammatic illustration of the computer of FIG. 1, according to an example embodiment.

In an example embodiment, as illustrated in FIG. 3 with continuing reference to FIG. 1, the computer 20 includes a GUI 20a, computer processor 20b and a computer readable medium 20c operably coupled thereto. Instructions accessible to, and executable by, the computer processor 20b are stored on the computer readable medium 20c. A database 20d is also stored in the computer readable medium 20c. Generally, the GUI 20a can display a plurality of windows or screens to the user. The computer 20 also includes an input device 20e and an output device 20f. In some embodiments, the input device 20e and the output device 20f are the GUI 20a. In some embodiments, the user 70 provides inputs to the system 10 via a window that is displayed on the GUI 20a. However, the input device 20e can also be a microphone in some embodiments and the output device 20f is a speaker. In several example embodiments, the computer 20 is, or includes, a telephone, a personal computer, a personal digital assistant, a cellular telephone or mobile phone, other types of telecommunications devices, other types of computing devices, and/or any combination thereof. In several example embodiments, the computer 20 includes a plurality of remote user devices.

In one or more example embodiments, the vigilant application 15 is stored in the computer readable medium 20c of the computer 20. In some embodiments, the vigilant application 15 is a mobile application developed in the iOS platform. In some embodiments, the vigilant application 15 includes and/or executes one or more web-based programs, Intranet-based programs, and/or any combination thereof. In an example embodiment, the vigilant application 15 includes a computer program including a plurality of instructions, data, and/or any combination thereof. In an example embodiment, the application is written in, for example, HyperText Markup Language (HTML), Cascading Style Sheets (CSS), JavaScript, Extensible Markup Language (XML), asynchronous Javascript and XML (Ajax), iOS, xCode, Swift, Android for mobile, and/or any combination thereof. In an example embodiment, the vigilant application 15 is a web-based application written in, for example, Java or Adobe Flex, which pulls real-time information from the computer 20, and/or the one or more applications 35. In an example embodiment, the vigilant application 15 pulls real-time information from the server 30, any one or more of the cameras 25-25f, and/or one or more applications 35, upon the execution, opening or start-up of the vigilant application 15. In some embodiments, the vigilant application 15 is or includes a mobile application downloaded on the computer 20 of the user.

Figure 4B:
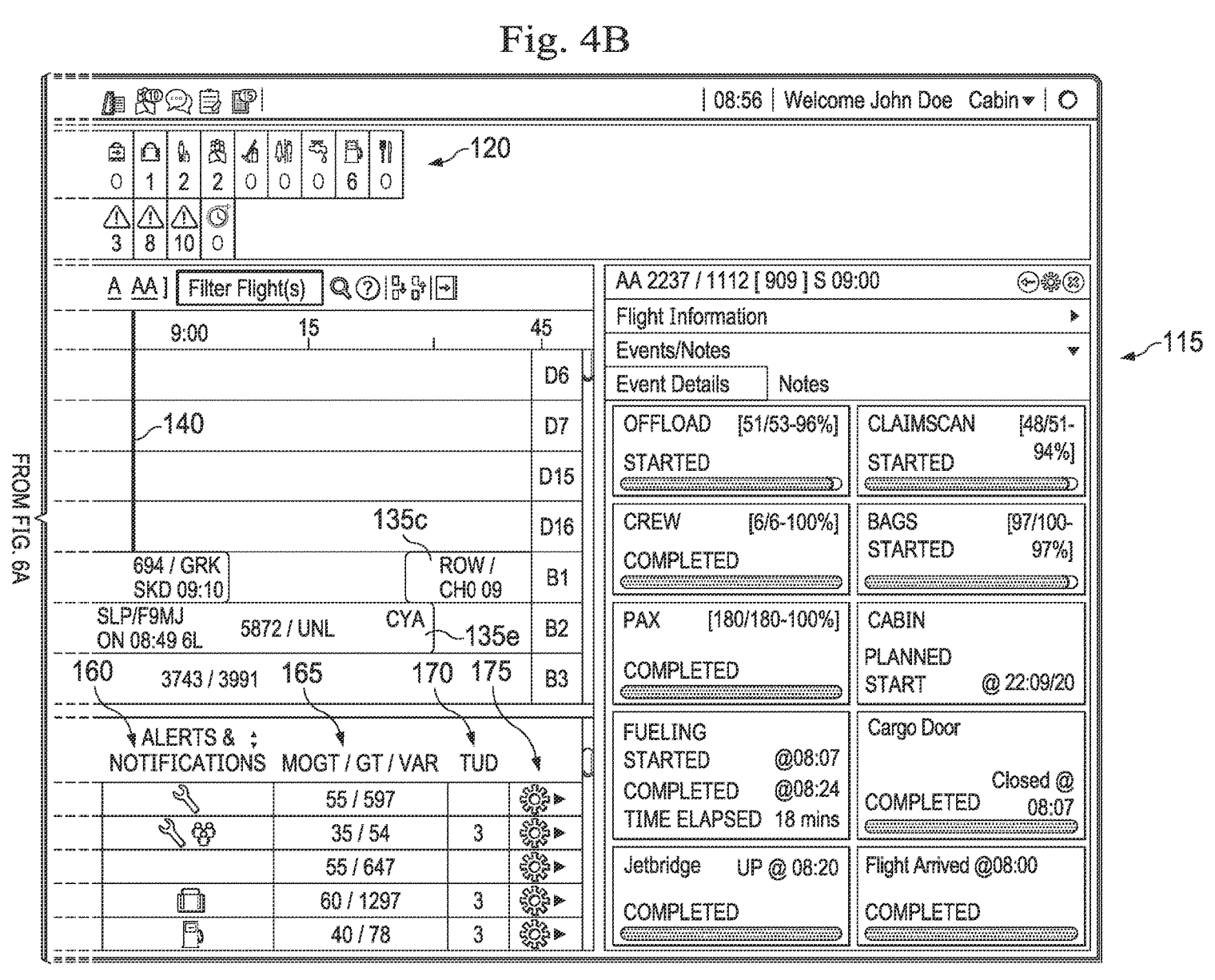

As illustrated in FIGS. 4A and 4B, the vigilant application 15 causes the screen 75 to be displayed on the GUI 20a of the computer 20. In some embodiments, the screen 75 is displayed on the GUI 20a when the computer 20 is a vigilant application 15 is a desktop application and/or when the computer 20 is desktop computer. The screen 75 includes a timeline portion 105 that provides a visual depiction of scheduled turnaround times for aircraft at different airport gates of the airport 45; a chart portion 110 that provides details regarding the turnarounds in a spreadsheet-like view; an additional detail portion 115 that provides details regarding the gate turnaround process for a specific aircraft; and an alert dashboard portion 120 that provides a visual depiction of the number and types of alerts.

Generally, the timeline portion 105 includes a gate axis 125 listing a plurality of airport gates that includes the gates 55b, 55c, 55d, 55e, 55f, and 55g; a time axis 130—perpendicular to the gate axis 125—that represents a period of time; and blocks 135a, 135b, 135c, 135d, 135e, and 135f. Each of the blocks 135a-135f is positioned relative to the gate axis 125 to be associated with an airport gate and extends along the time axis 130 to represent the time during which an aircraft is scheduled for a turnaround at the airport gate. The timeline portion 105 also includes a line 140 that extends parallel to the gate axis 125 and is positioned perpendicular to the time axis 130 at a position representing the current time. As illustrated, the block 135d is positioned relative to the gate axis 125 such that it aligns with the gate "B2" or gate 55g on the gate axis 125 and it extends across the time axis 130 to reflect a start time of approximately 7:38 and end time of 8:39. Text is positioned within the block 135d that identifies the aircraft as having departed from Lake Charles Regional Airport ("LCH") with the flight number 3540 and to depart from the airport 45 as flight number 3848. Portions of the time axis 130 that are not associated with blocks are time in which no aircraft is positioned or scheduled to be positioned at the gate. In some embodiments, a visual indicator is located within blocks that are associated with an alert or delay. In some embodiments, a visual indicator is a background color that indicates a status of the turnaround, an icon that represents a graphical depiction associated with the delay, flashing or blinking background or text, etc. Generally, each block is selectable and selecting a block provides additional information regarding the turnaround in the additional detail portion 115. Moreover, a user can scroll up and down along the gate axis 125 to view different gates and can scroll right and left along the time axis 130 to change the displayed time period.

In some embodiments, the chart portion 110 includes a spreadsheet-like view of the turnarounds associated with a specific airport, such as the airport 45, or terminal, such as the terminal 50. In some embodiments, the chart portion 110 includes an arrival flight detail section 142, equipment type section 145, tail section 150, departure flight detail section 155, alert and notification section 160, a MOGT/GT/VAR section 165, a TUD section 170, and a selectable button 175 associated with each turnaround. In some embodiments, the arrival flight detail section 142 includes columns associated with Gate, Flight number, Origination, status, and LAT. In some embodiments, the departure flight detail section 155 includes columns associated with gate, flight number, destination, LDT, status, and ETD code. In some embodiments, a status of the flight listed in the status column includes OUT, which is associated with the departing aircraft chocks being pulled, SKD, which is associated with a schedule, and ETD, which is associated with an estimated time of departure among others. As illustrated, an alert relating to a delay or potential delay can be displayed in the alert and notification section 160 to provide a visual depiction of the type of alert associated with a turnaround.

In some embodiments, the additional detail portion 115 includes flight information for a specific turnaround and event details regarding a specific turnaround. The event details include action items that must be completed to complete the turnaround and the status of each. In some embodiments, the status of each includes a percentage of complete chart and textual display, a start time, completed time, and duration of an activity, etc.

In some embodiments, the alerts dashboard portion 120 includes a visual depiction of an alert and a numerical value of the total of each alert. For example and regarding the visual depiction of alerts illustrated in the alerts dashboard portion 120 and the turnarounds detail portion 110, the visual alert may be a graphical illustration of the type of alert. For example, a wrench may be the graphical illustration for a maintenance related alert, a bag may be the graphical illustration for a baggage related alert, and picture of crew may be the graphical illustration for a crew related alert.

Figure 5:
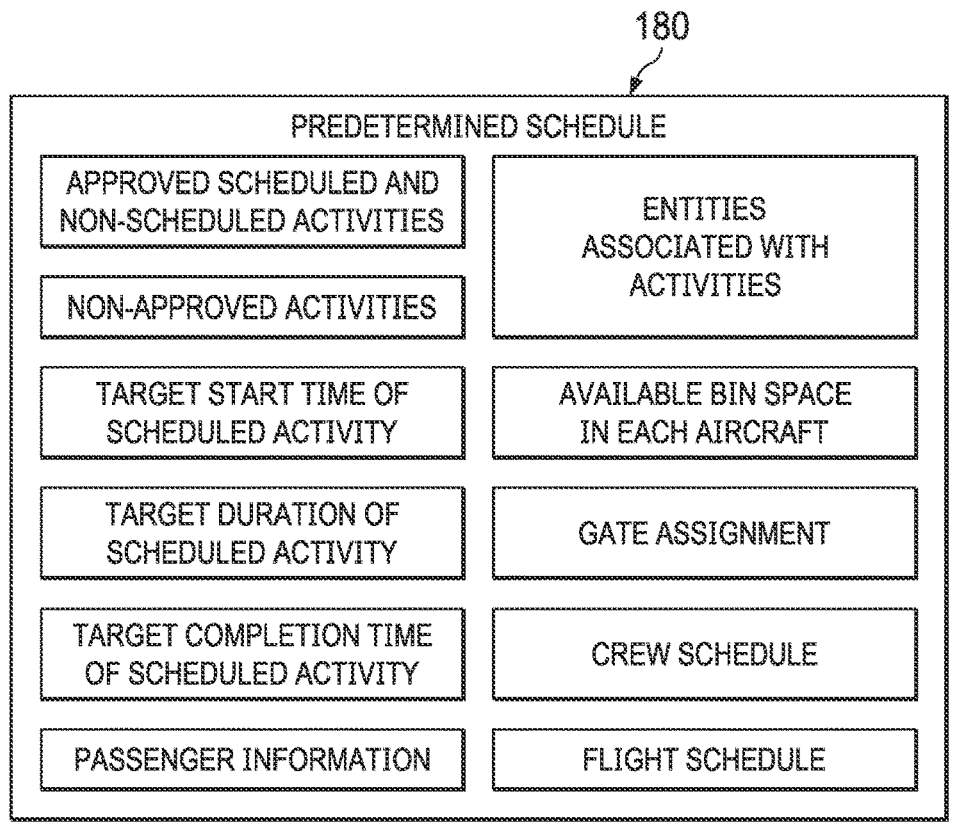
FIG. 5 is a diagrammatic illustration of a predetermined schedule that is accessed by the system of FIG. 1, according to an example embodiment.

In one or more embodiments, the application 15 is configured to access a predetermined schedule. As illustrated in FIG. 5, a predetermined scheduled 180 includes data or information regarding approved scheduled and non-scheduled activities; non-approved activities; a target start time of a scheduled activity; a target duration of a scheduled activity; a target completion time of a scheduled activity; passenger information; entities associated with activities; available bin space in each aircraft; gate assignments; crew schedules; and flight schedules. In some embodiments, the predetermined schedule includes data from a variety of databases and it is not required that the predetermined schedule is a stand-alone file or document. For example, data regarding the flight schedule may be stored in or accessed via one of the one or more applications 35 while the crew schedule may be stored in or accessed via another of the one or more applications 35.

Figure 6:
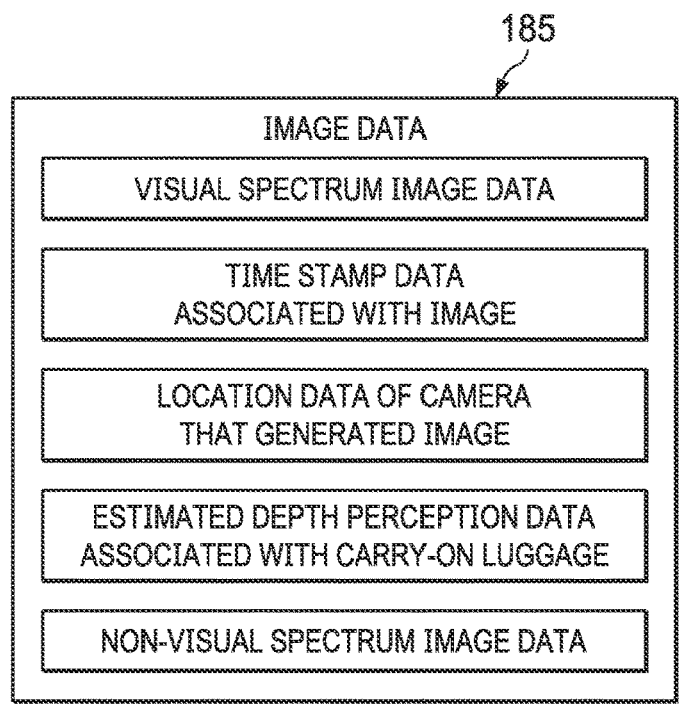
FIG. 6 is a diagrammatic illustration of image data that is generated by the camera of FIG. 1, according to an example embodiment.

In an example embodiment, each of the cameras 25a-25f is an internet protocol ("IP") camera, visual spectrum vision camera that records the visible spectrum of light (i.e., not an infrared camera), a full-spectrum camera such as an infrared, ultraviolet, or other camera, a depth perception camera, an augmented reality ("AR") camera, and/or a camera that is otherwise configured to estimate dimensions and depths of an object. In an example embodiment and illustrated in FIG. 6, the camera 25a generates image data 185 that includes visual spectrum image data, time stamp data associated with the creation of the image data, location data of the camera 25a that generated the image data, estimated depth perception data associated with carry-on luggage 100, and/or non-visual spectrum image data. In some embodiments, the image data includes a still picture of an activity while in other embodiments the image data includes a video of or multiple pictures of an activity.

In an example embodiment, the machine learning processing server 30 accesses the image data 185 sent from one or more of the cameras 25a-25f. In some embodiments, the machine learning processing server 30 receives the image data and identifies an activity or text depicted in the visual spectrum image data and/or the non-visual spectrum image data. In some embodiments, the machine learning processing server 30 receives an image (e.g., still image or video image) in base 64 format, PNG format, TIF format, JPG file format, Flash Video format, a 0.264 format, a .h264 format among others and converts a picture or image of text into a text in a computer readable format, such as for example JSON. In some embodiments, the machine learning processing server 30 includes an image to image-description application, which receives/accesses the image and identifies or assigns a descriptor of items depicted in the image. That is, the image to image-description application can assign a descriptor of "jet bridge extended" to an image that include a jet bridge that is extended towards an aircraft without the text "jet bridge" or "extended" forming a portion of the image. In some embodiments, the image to image-description application recognizes and identifies trademarks, branding, QR codes, etc. In some embodiments, the machine learning processing server 30 involves or uses artificial intelligence (AI) to implement more advanced methods of identifying activities and actors of the activities within the gate 55a. In some embodiments, the machine learning processing server 30 reads a barcode, QR, or other machine-readable optical label that contains information. In some embodiments, the machine learning processing server 30 is trained to detect a variety of activities that occur within the gate 55a. In some embodiments, the processing server 30 includes one or more central processing units (CPUs) and one or more graphics processing units (GPUs). The mobile application and the desktop application of the application 15 are each in communication with the machine learning processing server 30. Downline system(s) are also in communication with the machine learning processing server via the one or more applications 35. In an example embodiment, the GPU(s) include a Vision Processing Unit such as, for example, one or more Intel® Movidius™ chips.

In an example embodiment, the one or more applications 35 includes data sources that include data relating to upcoming flight plans of users or customers, flight schedules, flight numbers and origination location and departure destination for each flight number, passenger data, etc. In one embodiment, the one or more applications 35 receives data relating to transportation systems. In one embodiment, the one or more applications 35 receives data relating to flight operations. In one embodiment, the one or more applications 35 receives data relating to a flight from a plurality of flights, the flight using an airplane and having a departure location and a destination location. Generally, flights are scheduled such that one airplane has a destination location that is then the departure location for the next flight associated with that aircraft. As noted above, a gate turnaround is completed between the flights to ready the flight for the next flight. When the gate turnaround exceeds the scheduled time period, the next aircraft that is scheduled to turnaround at the gate is delayed as well as other downstream flights.

In an example embodiment, the network 40 includes the Internet, one or more local area networks, one or more wide area networks, one or more cellular networks, one or more wireless networks, one or more voice networks, one or more data networks, one or more communication systems, and/or any combination thereof.

Figure 7:
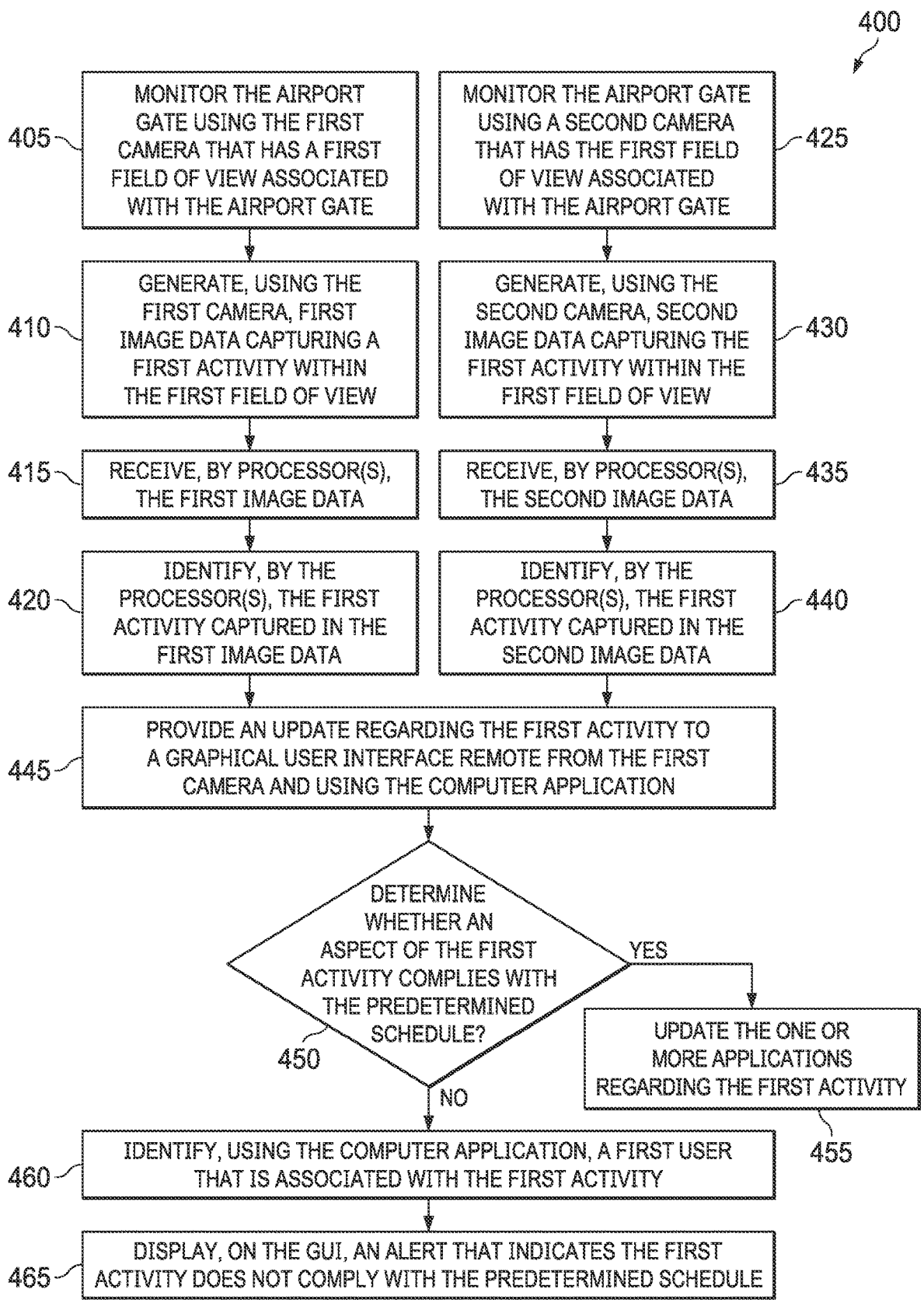
FIG. 7 a flow chart illustration of a method of operating the system of FIGS. 1-6, according to an example embodiment.

In an example embodiment, as illustrated in FIG. 7 with continuing reference to FIGS. 1-3, 4A, 4b, 5, and 6, a method 400 of operating the system 10 includes monitoring the airport gate 55a using the camera 25a that has a first field of view associated with the airport gate 55a at step 405; generating, using the camera 25a, first image data capturing a first activity within the first field of view at step 410; receiving, by processor(s), the first image data at step 415; identifying, by the processor(s), the first activity captured in the first image data at step 420; monitoring the airport gate 55a using the camera 25f that has a second field of view associated with the airport gate 55a at step 425; generating, using the camera 25f, second image data capturing the first activity within the second field of view at step 430; receiving, by the processor(s), the second image data at step 435; identifying, by the processor(s), the first activity captured in the second image data at step 440; providing, using the application 15, an update regarding the first activity to the GUI 20a that is remote from the first camera 25a at step 445; determining whether aspect(s) of the first activity comply with the predetermined schedule 180 at step 450; if the aspect(s) comply, then updating the one or more applications at step 455; if the aspect(s) do not comply, then identifying, using the application 15, a first user that is associated with the first activity at step 460 and displaying an alert on the GUI 20a that indicates the first activity does not comply with the predetermined schedule at step 465.

Figure 8:
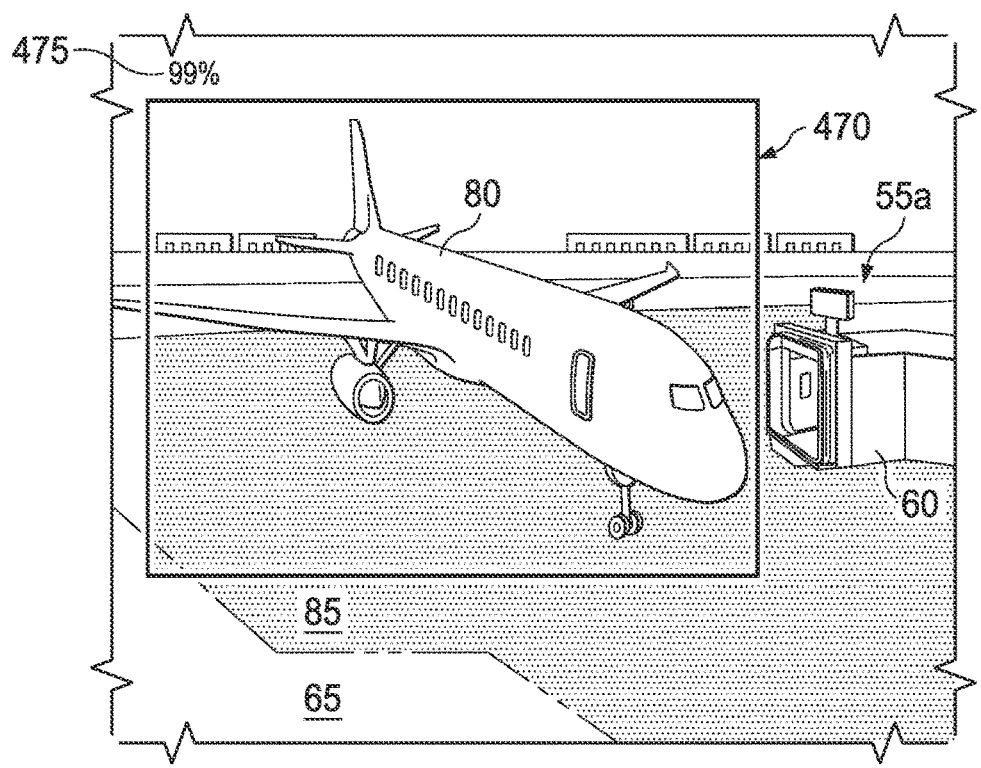
FIGS. 8-22 are diagrammatic illustrations of windows displayed on the GUI of the computer of FIG. 1, according to an example embodiment.
Figure 9:
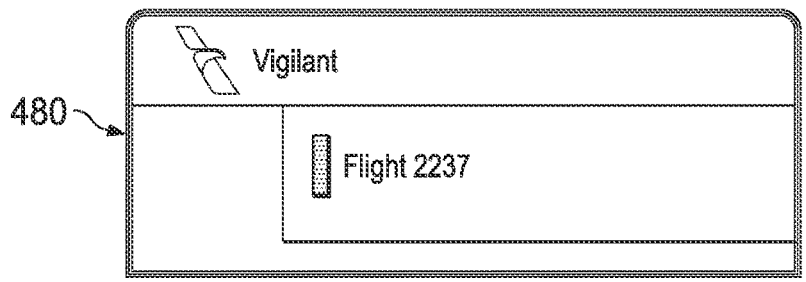

In some embodiments and at the step 405, the camera 25a monitors the airport gate 55a. The field of view of the camera 25a is illustrated in FIG. 8, which includes the aircraft 80 entering the safety zone 85 of the gate 55a. In some embodiments, the field of view of the camera 25a is also displayed on the GUI 20a of the computer 20.

In some embodiments and at the step 410, the camera 25a generates image data that captures an activity within the first field of view. In some embodiments and as illustrated in FIG. 8, the activity is the arrival of the aircraft 80 within the safety zone 85.

In some embodiments and at the step 415, the image data is received by the processor(s). In some embodiments, the machine learning processing server 30 receives the image data and detects the activity captured within the image data. In some embodiments, the machine learning processing server 30 forms a portion of the application 15 and receipt of the image data to the application 15 is also receipt of the image data to the machine learning processing server 30. In some embodiments, the image data is sent to the processor(s) via the network 40.

In some embodiments and at the step 420, the system 10 identifies, by the processor(s), the activity captured in the image data. Referring back to FIG. 8, the activity detected is the arrival of the aircraft 80 to the safety zone 85. In some embodiments, the system 10 assigns a confidence level score to the identification of the activity. Generally, the identified activity within the first image data is highlighted via a box 470 and a confidence level score 475 is positioned relative to the box 470.

In some embodiments and at the step 425, the camera 25f monitors the airport gate 55a. As illustrated in FIG. 2, the camera 25f has a field of view that includes a portion of the gate 55a, such as for example a portion of the jet bridge 60 and the safety zone 85. Generally, the field of views of the cameras 25a and 25f are substantially similar while in other embodiments the field of views of the cameras 25a and 25f are different but at least overlap. In some embodiments, the steps 405 and 425 occur simultaneously such that two cameras (e.g., 25a and 25f) capture the same activity. In some embodiments, the camera 25a is a visual spectrum camera and the camera 25f is an infrared camera or full-spectrum camera. The use of the cameras 25a and 25f are often useful when the camera 25a has reduced visibility, for example due to weather conditions, and the infrared camera 25f provides information regarding activities that otherwise may not be visible to the camera 25a. For example, the infrared camera 25f may improve system performance at night, during rainstorms, during snowstorms, other conditions where visibility is poor, etc.

In some embodiments and at the step 430, the camera 25f generates image data that captures the first activity. In one example, the image data from the camera 25f includes non-visual spectrum image data, such as infrared data regarding the first activity. For example and referring to FIG.

8, when the aircraft 80 drives or is parked within the safety zone 85, the camera 25f generates image data of the aircraft 80 within the safety zone 85.

In some embodiments and at the step 435, the image data is received by the processor(s) and from the camera 25f. Generally, the step 435 is identical or substantially similar to the step 415.

In some embodiments and at the step 440, identifying, by the processor(s), the first activity captured in the image data received from the camera 25f. Referring back to FIG. 8, the activity detected is the arrival of the aircraft 80 to the safety zone 85. In some embodiments, the identification of the activity is confirmed using the image data from the cameras 25a and 25f. In some embodiments, the confidence level score 475, when the identification of the activity is confirmed using the first and second image data, is greater than the confidence level score when the identification of the activity is confirmed based one only of the first image data and the second image data. Based on the location of the cameras 25a and 25f, the image data, and the timestamp, the application 15 and/or the server 30 determines that the aircraft 80 is associated with flight 2237. That is, the aircraft associated with the flight 2237 has arrived at its destination location and is parked in the gate 55a associated with the turnaround for the flight 2237. In some embodiments, the application 15 and/or the server 30 accesses the predetermined schedule 180 and compares the image data, such as the location of the cameras 25a and 125f to the gate assignment of the predetermined schedule to determine that the aircraft parking at the gate 55a is the aircraft associated with the flight 2237. Moreover, in some embodiments, the application 15 and/or the server 30 accesses the predetermined schedule 180 and compares the image data, such as the time stamp with the flight schedule of the predetermined schedule 180 to determine that the aircraft parking at the gate 55a is the aircraft associated with the flight 2237.

Figures 11, 12:
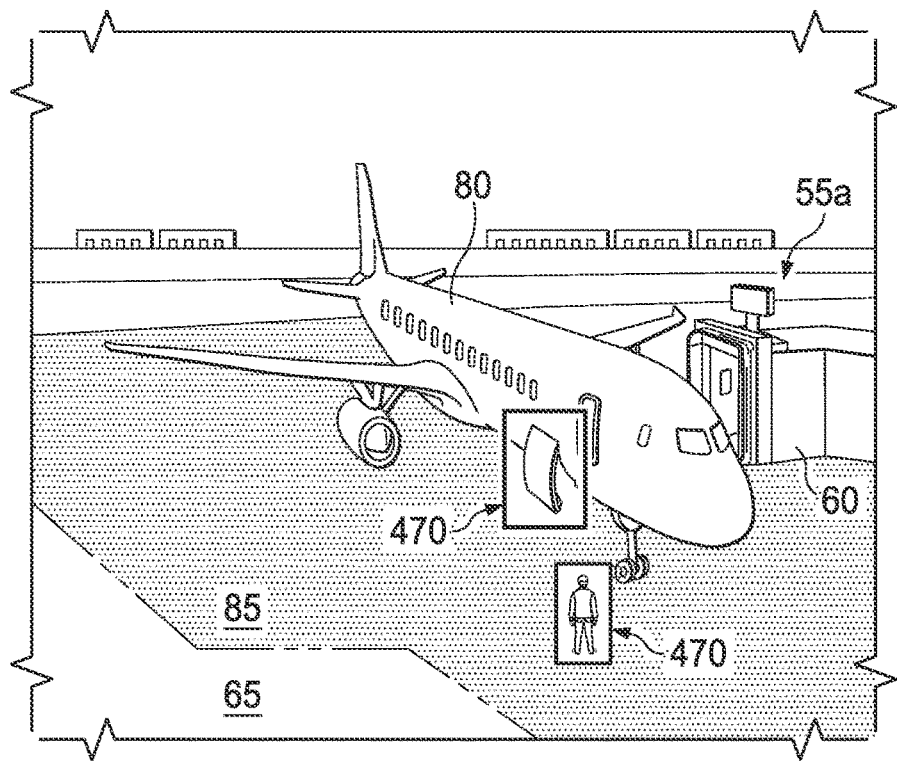

In some embodiments and at the step 445, an update is provided to the GUI 20a regarding the activity. In some embodiments and as illustrated in FIG. 12, the application 15 causes a screen 480 to be displayed on the GUI 20a. In some embodiments, the computer 20 is a remote user device and the update is provided by displaying the screen 480 on the GUI 20a. As illustrated, the update relates to the arrival of flight 2237. However, in some embodiments, the computer 20 is a desktop computer and the application 15 displays the screen 75 (illustrated in FIGS. 4A and 4B) and the update includes providing a status of "IN" in the status portion for the flight 2237 and/or providing the time at which the aircraft arrived in the LAT portion for the flight 2237. However, the time displayed in the LAT portion is not required to be the time at which the aircraft arrived at the gate 55a but could be the time at which the aircraft landed at the airport 45. As such and an example embodiment, the system 10 displays a log of activities on the GUI of the mobile application and/or desktop application. This log is built as the system 10 identifies/detects activities within the gate 55a.

In some embodiments and at the step 450, the system 10 compares, using the vigilant application 15, aspect(s) of the activity with the predetermined schedule 180. Generally, aspects of the activity include the time at which the activity occurred (i.e., time stamp associated with the activity), the duration of the activity (i.e., difference between the time stamp associated with the activity being completed and the activity beginning), the type of activity (i.e., opening of cargo, entering safety zone 85, movement within the safety zone 85), etc. In some embodiments and during the step 450, the time stamp associated with the activity is compared to the target start time of the schedule activity. In other embodiments, the type of activity (i.e., aircraft being parked in the safety zone 85) is an approved scheduled activity. In some embodiments, the system 10 does not compare the type of activity with the non-approved activities of the predetermined schedule when the type of activity is one of the approved scheduled or approved non-scheduled activities. Aspect(s) of the activity do not comply with the predetermined schedule when the time stamp is later than the target start time or completion time, when the type of activity is not an approved scheduled and non-scheduled activity, when the type of activity is a non-approved activity, when the duration of the activity exceeds the target duration of the scheduled activity, etc. In some embodiments, the step 450 includes determining if the target time (e.g., target start time, duration, or end time) has been exceeded by a threshold amount. For example and in some embodiments, if the actual time is greater than the target time by a threshold amount, the next step is the step 460 and if the actual time is not greater than the target time by the threshold amount, then then next step is the step 455.

In some embodiments and at the step 455, when the aspect(s) of the first activity comply with the predetermined schedule and/or when an actual time is not greater than the target time by the threshold amount, the method 400 then includes updating the one or more applications 35. In some embodiments, the one or more applications 35 is updated to reflect the arrival of the aircraft associated with the flight 2237 to the gate 55a, etc.

In some embodiments and at the step 460, when the aspect(s) of the first activity do not comply with the predetermined schedule, the method 400 then includes identifying, using the computer application 15, a first user that is associated with the activity. In some embodiments, identifying the first user that is associated with the activity includes accessing the predetermined schedule 180. For example, when the first activity is fueling the aircraft, then the entity associated with the first activity is a fuel provider.

Figure 10:
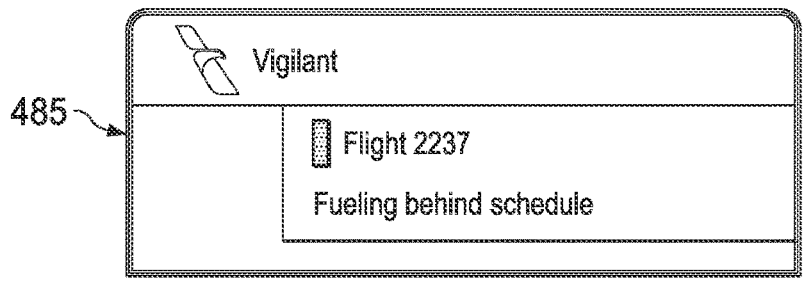

In some embodiments and at the step 465, an alert is displayed that indicates that the activity does not comply with the predetermined schedule. For example and as illustrated in FIG. 10, when the first activity is fueling the aircraft and the time stamp is later than the target start time, a screen 485 is displayed on the GUI 20a that indicates that the fueling is behind schedule. In some embodiments, the screen 485 is the alert. In some embodiments, the alert is also displayed on the screen 75 in the alerts and notifications section 160 to indicate that the fueling is behind schedule. An example of a fuel notification is illustrated in FIG. 4B and is associated with the gate B35. The number of fuel notifications in the dashboard 120 is also updated to reflect an increase in fuel delays or potential fuel delays. For example, the numeral 6 is displayed below the icon or visual indicator associated with fuel. In some embodiments, one detected activity of a turnaround causes a plurality of alerts to be displayed on multiple GUIs, with each GUI associated with an entity or person that is involved in that turnaround. In some embodiments, the alerts are tailored to the entity or person receiving the alert.

The method 400 repeats to monitor, report, and provide updates regarding multiple activities associated with a turnaround. For example and as illustrated in FIG. 11, the activity is the opening of a cargo door on the aircraft 80. The box 470 identifies the portion of the image in which the detected activity occurs. The application 15 updates the screen 75 to note that the cargo door has been opened. The system 10 also updates the screen 480 as illustrated in FIG. 12 to note that the cargo door opened at 8:00. That is, the application 15 displays the term "Cargo" and an actual start timestamp on the GUI 20a of the computer 20 (e.g., remote user device or desktop computer), indicating that cargo activity has started. Moreover, and as illustrated in FIG. 11, a person is standing in the safety zone 85. In this example, the system 10 identifies the activity as not complying with the predetermined schedule because a person standing in the safety zone 85 is a non-approved activity. The system 10 then identifies the person standing in the safety zone 85 and provides an alert via a screen 490 illustrated in FIG. 13 to the person standing in the safety zone 85. The screen 490 is displayed on the GUI 20a and the computer 20 is associated with the person standing in the safety zone. A non-approved activity is not limited to a person standing within the safety zone and can include a variety of activities or positions of items within the safety zone 85. For example, a fuel truck being within the safety zone 85 is an approved activity, but if the fuel truck is parked at a non-approved location within the safety zone 85 then the parking location can be a non-approved activity.

Figure 14:
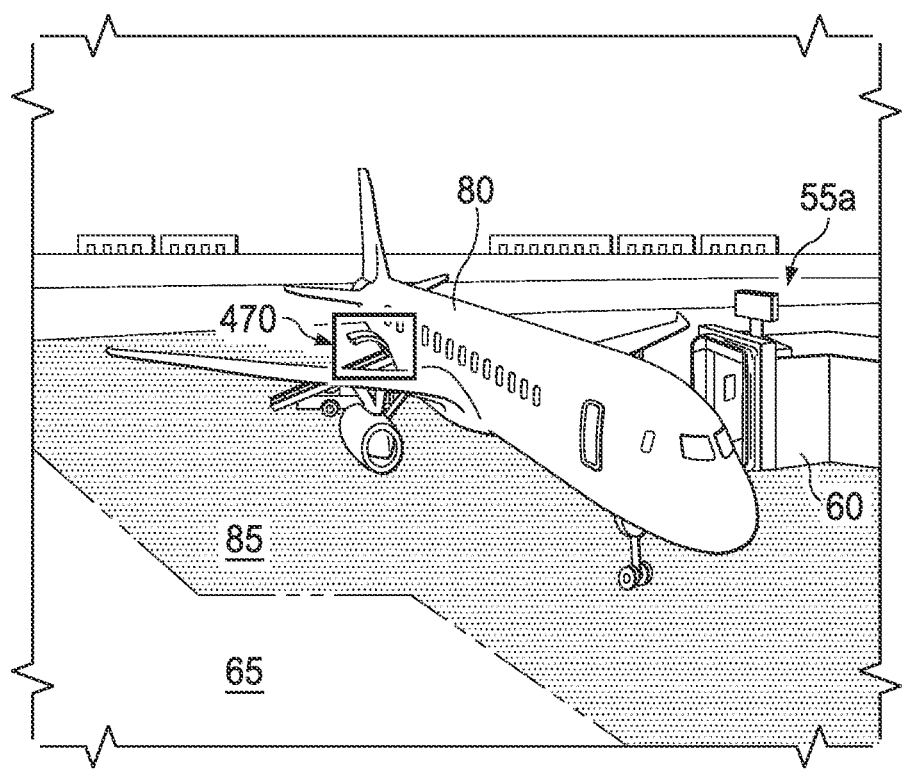

In one embodiment and as illustrated in FIG. 14, the activity is the opening of a baggage door on the aircraft 80. The box 470 identifies the portion of the image in which the detected activity occurs. The application 15 updates the screen 75 to note that the baggage door has been opened. The system 10 also updates the screen 480 as illustrated in FIG. 12 to note that the cargo door opened at 8:01. That is, the application 15 displays the term "Bags" and an actual start timestamp on the GUI 20a of the computer 20 (e.g., remote user device or desktop computer), indicating that baggage activity has started.

Figure 13:
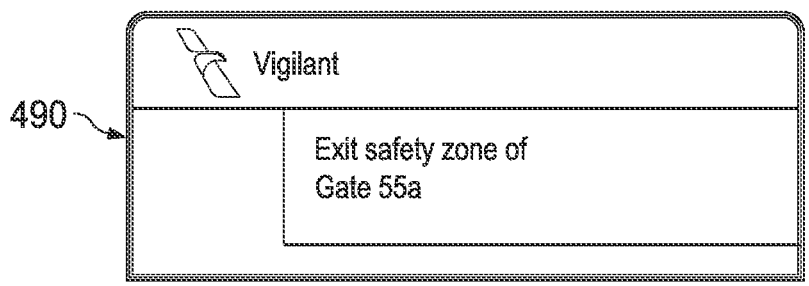
Figure 15:
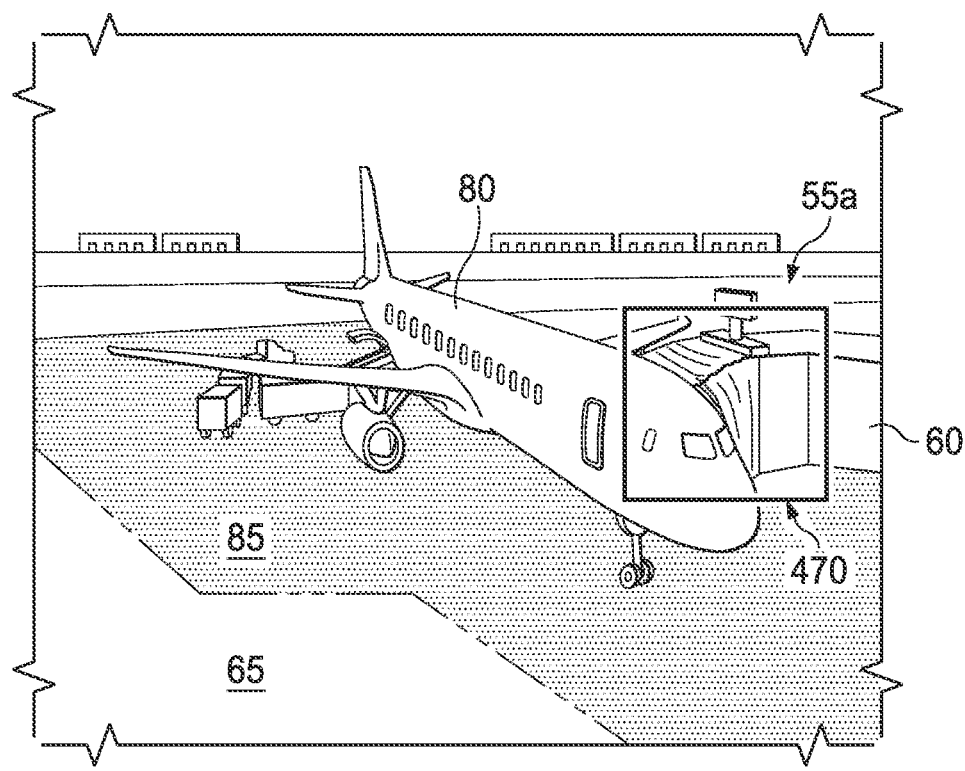

In one embodiment and as illustrated in FIG. 15, the activity is the jet bridge being attached to the aircraft 80. The box 470 identifies the portion of the image in which the detected activity occurs. The application 15 updates the screen 75 to note that the jet bridge has been attached to the aircraft 80. The system 10 also updates the screen 480 as illustrated in FIG. 13 to note that the jet bridge activity began at 8:05. That is, the application 15 displays the term "Jet bridge" and an actual start timestamp on the GUI 20a of the computer 20 (e.g., remote user device or desktop computer), indicating that jet bridge activity has started.

Figure 16:
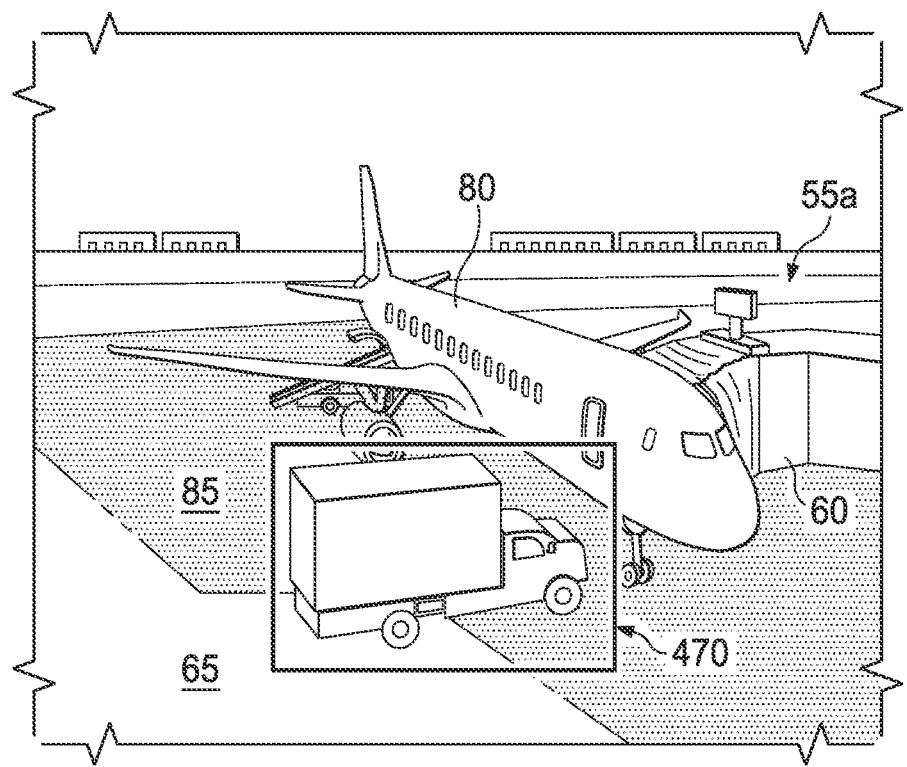

In one embodiment and as illustrated in FIG. 16, the activity is the arrival of a catering truck proximate the aircraft 80. The box 470 identifies the portion of the image in which the detected activity occurs. The application 15 updates the screen 75 to note that the catering truck has arrived at the safety zone 85. The system 10 also updates the screen 480 as illustrated in FIG. 12 to note that the catering activity began at 8:01. That is, the application 15 displays the term "Catering" and an actual start timestamp on the GUI 20a of the computer 20 (e.g., remote user device or desktop computer), indicating that catering activity has started.

Figure 17:
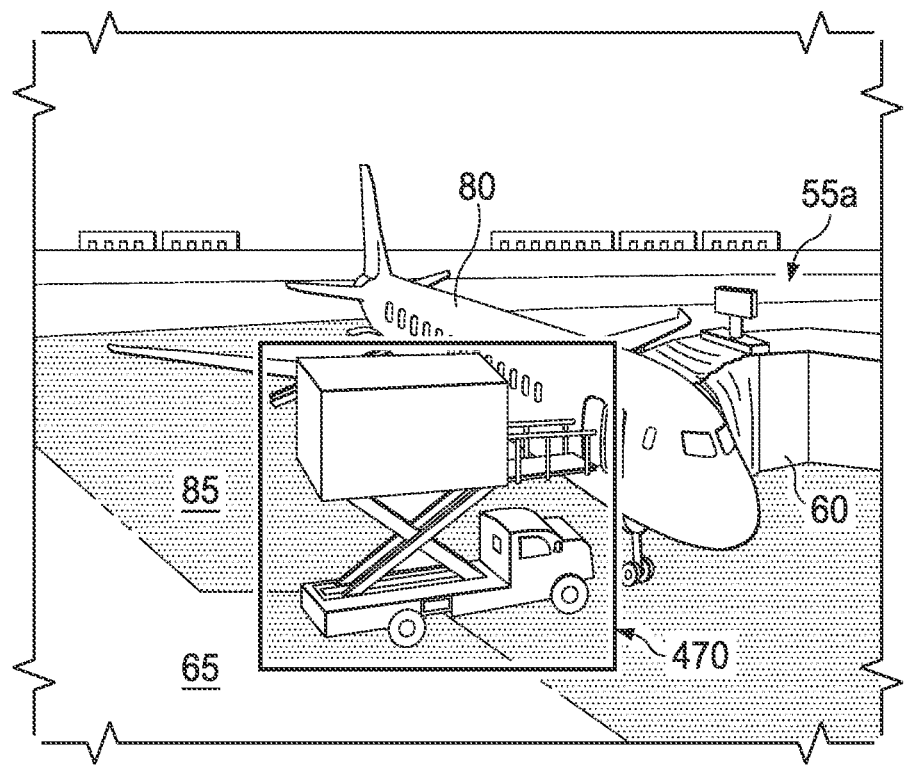

In one embodiment and as illustrated in FIG. 17, the activity is catering employee starting catering tasks. The box 470 identifies the portion of the image in which the detected activity occurs. The application 15 updates the screen 75 to note that the catering employee has started catering tasks. The system 10 also updates the screen 480 as illustrated in FIG. 12 to note that the catering activity began at 8:01. That is, the application 15 displays the term "Catering" and an actual start timestamp on the GUI 20a of the computer 20 (e.g., remote user device or desktop computer), indicating that catering activity has started. In some embodiments, the "catering" actual start timestamp is associated with the arrival of the catering truck proximate the aircraft 80 and in some embodiments the actual start timestamp is associated with the employee starting catering tasks.

Figure 18:
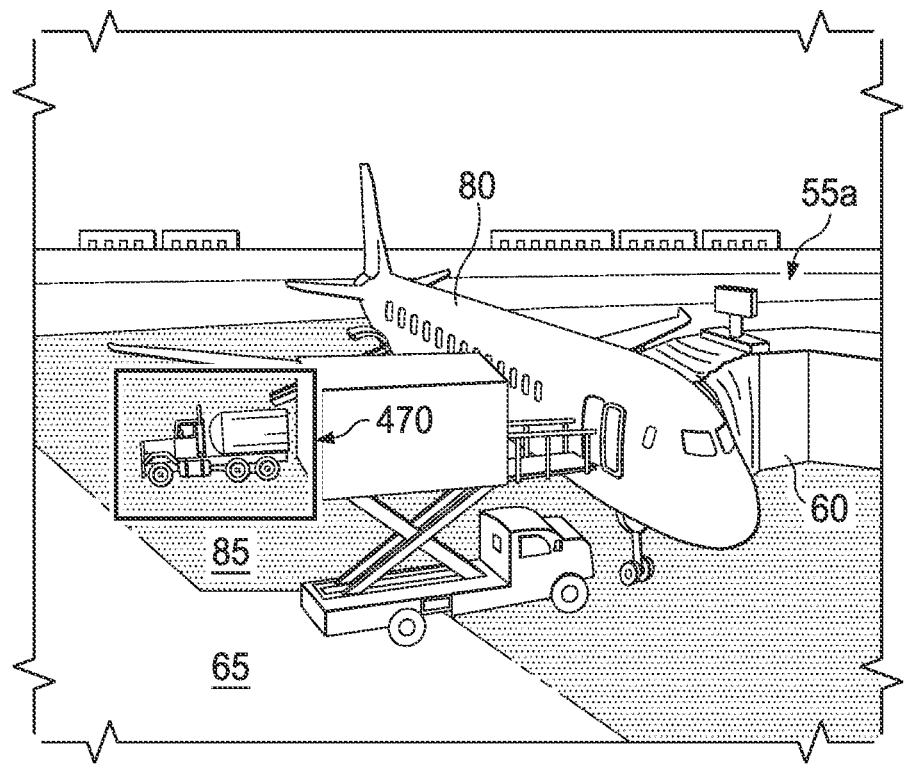

In one embodiment and as illustrated in FIG. 18, the activity is the arrival of a fuel truck proximate the aircraft 80. The box 470 identifies the portion of the image in which the detected activity occurs. The application 15 updates the screen 75 to note that the fuel truck has been attached to the aircraft 80. The system 10 also updates the screen 480 as illustrated in FIG. 12 to note that the fueling activity began at 8:10. That is, the application 15 displays the term "Fuel" and an actual start timestamp on the GUI 20a of the computer 20 (e.g., remote user device or desktop computer), indicating that fuel activity has started.

Figure 19:
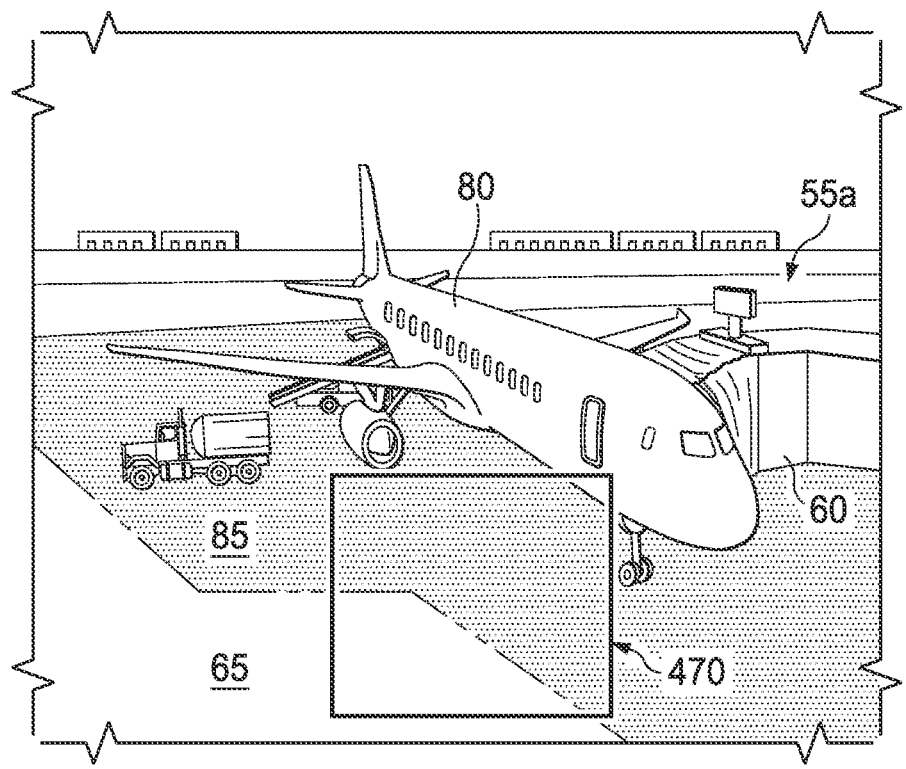

In one embodiment and as illustrated in FIG. 19, the activity is the departure of the catering truck out of the safety zone 85 and away from the aircraft 80. The box 470 identifies the portion of the image in which the detected activity occurs. The application 15 updates the screen 75 to note that the catering truck is out of the safety zone 85 and away from the aircraft 80. The system 10 also updates the screen 480 as illustrated in FIG. 12 to note that the catering activity ended at 8:17. That is, the application 15 displays the actual end timestamp on the GUI 20a of the computer 20 (e.g., remote user device or desktop computer), indicating that catering activity has ended.

Figure 20:
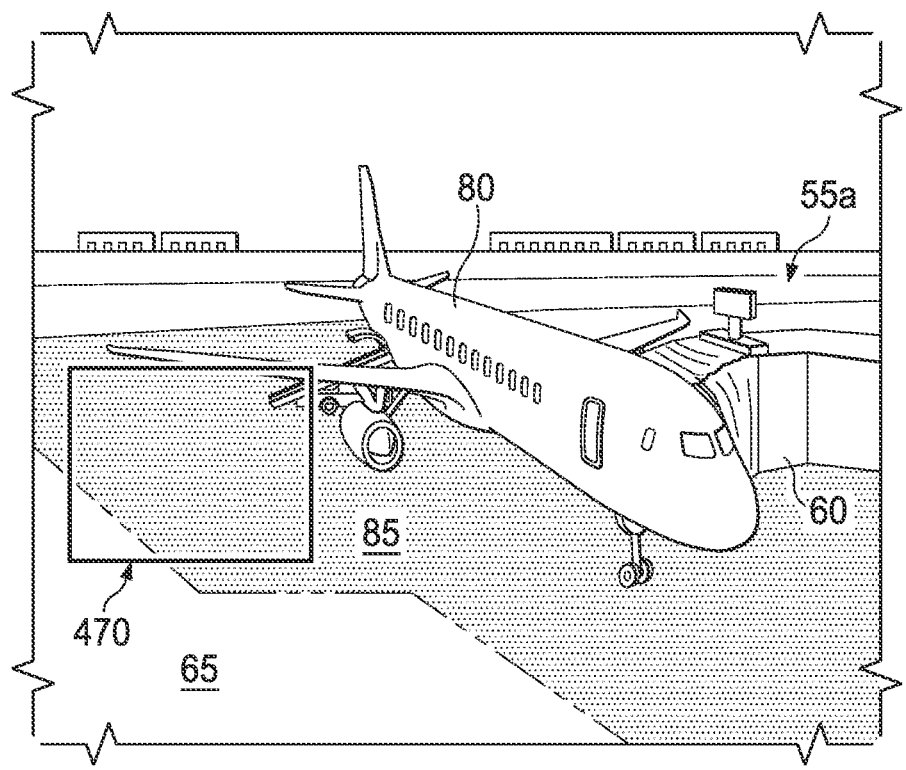

In one embodiment and as illustrated in FIG. 20, the activity is the departure of the fuel truck out of the safety zone 85 and away from the aircraft 80. The box 470 identifies the portion of the image in which the detected activity occurs. The application 15 updates the screen 75 to note that the fuel truck is out of the safety zone 85 and away from the aircraft 80. The system 10 also updates the screen 480 as illustrated in FIG. 12 to note that the fuel activity ended at 8:30. That is, the application 15 displays the actual end timestamp on the GUI 20a of the computer 20 (e.g., remote user device or desktop computer), indicating that fuel activity has ended.

Figure 21:
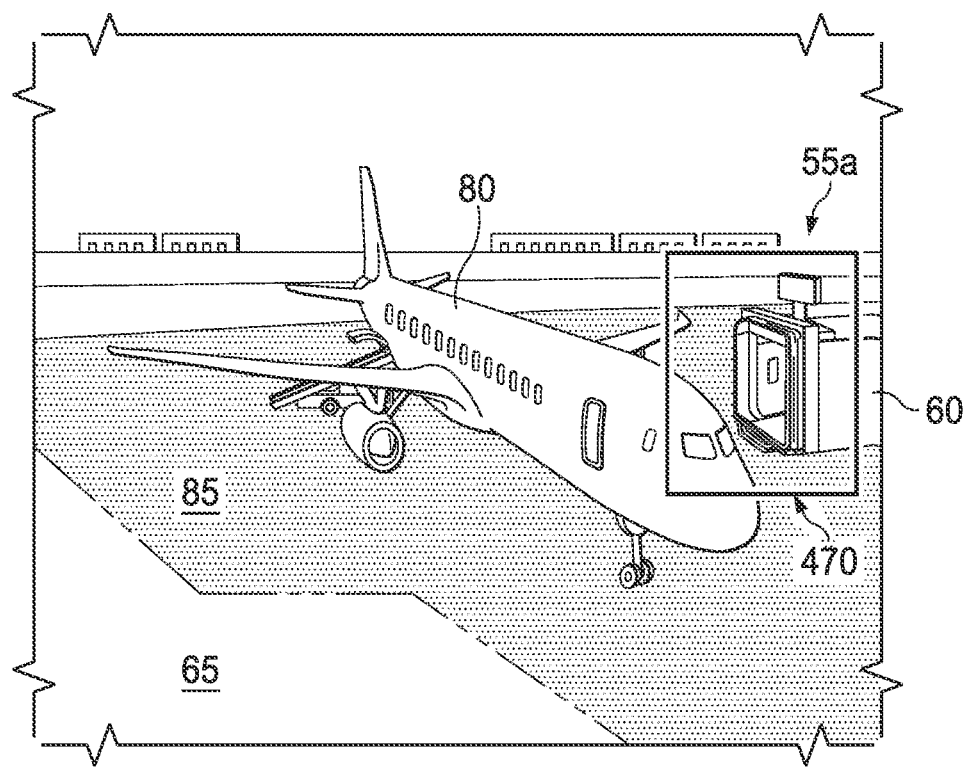

In one embodiment and as illustrated in FIG. 21, the activity is the retraction of the jet bridge 60 away from the aircraft 80. The box 470 identifies the portion of the image in which the detected activity occurs. The application 15 updates the screen 75 to note that the jet bridge is retracted away or detached from the aircraft 80. The system 10 also updates the screen 480 as illustrated in FIG. 12 to note that the jet bridge activity ended at 8:20. That is, the application 15 displays the actual end timestamp on the GUI 20a of the computer 20 (e.g., remote user device or desktop computer), indicating that jet bridge activity has ended.

Figure 22:
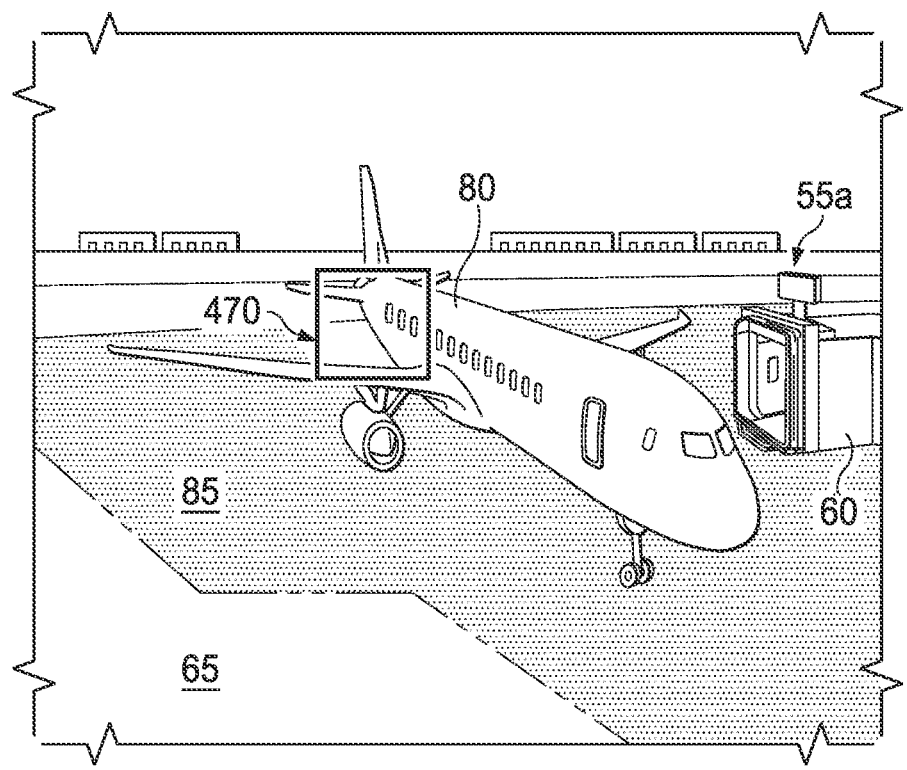

In one embodiment and as illustrated in FIG. 22, the activity is the baggage door on the aircraft 80 closing or being closed. The box 470 identifies the portion of the image in which the detected activity occurs. The application 15 updates the screen 75 to note that the baggage door is closed. The system 10 also updates the screen 480 as illustrated in FIG. 12 to note that the baggage activity ended at 8:20. That is, the application 15 displays the actual end timestamp on the GUI 20a of the computer 20 (e.g., remote user device or desktop computer), indicating that baggage activity has ended.

Figure 23:
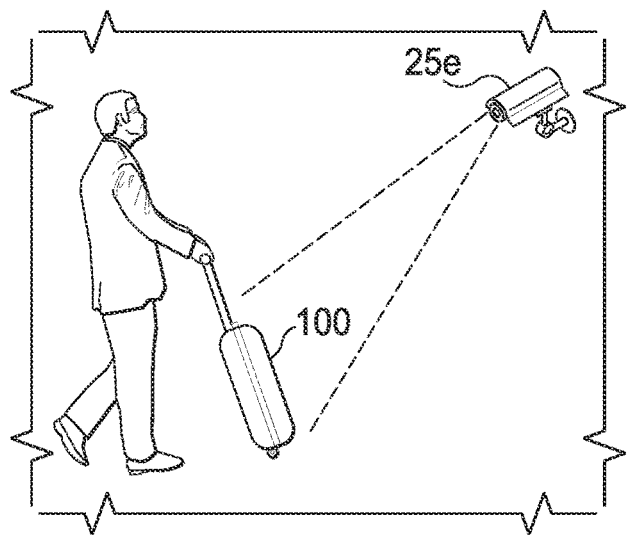
FIG. 23 is a diagrammatic illustration of a step performed during the method of FIG. 7, according to an example embodiment.
Figure 24:
FIG. 24 is a diagrammatic illustration of a window displayed on the GUI of the computer of FIG. 1, according to an example embodiment.

In one embodiment and as illustrated in FIG. 23, the activity is a passenger with carry-on luggage walking through the jet bridge 60 of the gate 55a. In some embodiments, the camera 25e is a camera that is configured to estimate dimensions and depths of an object and the camera 25e estimates the size of the carry-on luggage 100. As such, the estimated size of the carry-on luggage is an aspect of the image data that captures the carry-on luggage 100. In this embodiment, the step 445 of the method 400 may be omitted and the step 450 includes determining whether there is available bin space in the aircraft 80 for the carry-on luggage 100. In some embodiments, to determine whether there is available bin space in the aircraft 80, the system 10 refers to the predetermined schedule to identify the total volume of available bin space, total number of average-sized carry-ons capable of being stored in the bin space, model or type of bin-space containers, etc. Generally, the system 10 determines or identified the available amount of overhead bin space in the aircraft 80. Regardless, the size of the carry-on luggage 100 is estimated and compared to the remaining available overhead bin space. In some embodiments, the remaining available overhead bin space includes the difference between total available overhead bin space and the used overhead bin space. Generally, the used overhead bin space does not require that the bins are currently being used or are partially full. Instead, the used overhead bin space accounts for the number and size of bags that have already been detected by the camera 25e during the loading of passengers on the aircraft 80. For example and after 20 people have already passed by the camera 25e, only 3 passengers may have entered the cabin of the aircraft 80 and loaded his or her carry-on luggage in overhead bins, while the remaining 17 passengers have not yet entered the cabin of the aircraft 80. Regardless, the estimated space to be used by the remaining 17 passengers (based on the camera 25e) is considered and deducted from the remaining available overhead bin space. When there is no available overhead bin space and when a passenger with carry-on luggage 100 is detected by the camera 25e as attempting to enter the cabin of the aircraft 80 or walking through the jet bridge 60, the system 10 identifies the first user (e.g., airline employee or other person that is aiding in the boarding of the aircraft 80 in the area 95 or in the jet bridge 60) at the step 460. At the step 465, the alert is provided to the first user. An example of the alert, which may be a screen 500 displayed to the first user, is illustrated in FIG. 24. In some embodiments, the alert that there is no more available bin space is provided to the first user. Upon receiving the alert, the carry-on luggage 100 can be checked and stored in the baggage hold instead of the overhead bin storage area in the cabin of the aircraft 80. As such, upon receiving the alert, the carry-on luggage 100 is prevented from entering the cabin of the aircraft 80. In one embodiment, the activity is a passenger passing through the area 95 of the gate 55a and is detected via the camera 25d and the camera 25d estimates the size of the carry-on luggage 100. The method of sending an alert and preventing the carry-on luggage from entering the cabin using the camera 25d is identical to the method using the camera 25e except that the location at which the carry-on luggage is detected is in the area 95 instead of within the jet bridge 60. In some embodiments, the camera 25e and/or 25d transmit live video and/or images of the carry-on luggage 10 to the machine learning processing server 30, which counts the bags and detects the size of the bags. In several example embodiments, the machine learning processing server 30 determines whether the bins will be full, and/or whether the bins are close to being full, and sends an alert or message to a downline system indicating that the bins will be full and/or are close to being full. Accordingly, in response to receiving the alert or message on the downline system, airline personnel may proceed with tagging the bags that are not expected to fit in the bins, gate-checking those bags so that they bags are placed in a section of the hold of the aircraft 80. As a result, the system 10 avoids time delays associated in trying to fit those bags in the overhead bins, failing to fit those bags in the overhead bins, and subsequently gate-checking those bags.

The method 400 can be altered in a variety of ways. For example, the activity may be the aircraft 80 being parked in the safety zone 85 for a period of time without a fueling truck being parked in the safety zone 85. That is and, in some embodiments, the cameras 25a and/or 25f monitor the gate 55a and detect the absence of a scheduled activity. For example, at the target start time of the schedule activity, the application 15 determines whether the scheduled activity has begun (via monitoring the gate 55a via the cameras 25a and/or 25f). If the scheduled activity has not yet begun and the target start time of the schedule activity has passed, then the scheduled activity (fuel truck being parked in the safety zone 85) does not comply with the predetermined schedule 180 and the alert displayed in the step 465 is an alert that fueling has not yet began and is behind schedule.

In some embodiments, the FIGS. 8, 11, and 14-22 are illustrations of field of view of one or more cameras and are windows or screens displayed on the GUI 20a.

In an example embodiment and referring back to FIG. 12, if baggage activities begin after cargo activities, baggage information is displayed above the cargo information on the screen 480, the baggage information including scheduled baggage start time and scheduled baggage end time. When the system 10 detects the beginning of baggage activities, an actual start time is displayed. When the system 10 detects the ending of baggage activities, an actual end time is displayed.

In an example embodiment, if the jet bridge is attached to the aircraft 80 after the beginning of baggage activities, jet bridge information is displayed above, on the screen 480, the baggage information, the jet bridge information including scheduled jet bridge attachment time and scheduled jet bridge detachment time. When the system 10 detects the attachment of the jet bridge 60, an actual attachment start time is displayed. When the system 10 detects the detachment of the jet bridge 60, an actual detachment end time is displayed.

In an example embodiment, if catering activities begin after jet bridge activities, catering information is displayed above, on the screen 480, the jet bridge information, the catering information including scheduled catering start time and scheduled catering end time. When the system 10 detects the beginning of catering activities, an actual start time is displayed. When the system 10 detects the ending of catering activities, an actual end time is displayed.

In an example embodiment, if fueling activities begin after catering activities, fueling information is displayed above, on the screen 480, the catering information, the fueling information including scheduled fueling start time and scheduled fueling end time. When the system 10 detects the beginning of fueling activities, an actual start time is displayed. When the system 10 detects the ending of fueling activities, an actual end time is displayed.

In several example embodiments, the system 10 and/or the execution of at least a portion of the method 400 reduces error rates by automating tasks through computer vision via the cameras 25a-25f and backed with artificial intelligence, improves the timeliness of data regarding tarmac activities (e.g., activities within the safety zone 85 of the gate 55a and the safety zones of other gates), allows inference of new data elements to drive timely decisions and mitigate costly flight customer experience failures, saves millions of dollars per year in airline operating costs by reducing delays, enhances safety through object detection (especially in the safety zone), reduces accidental damage to the aircraft, and sends data easily to downline systems.

In several example embodiments, the computer vision/machine learning models of the system 10 log and monitor tarmac or gate activities. In several example embodiments, this is accomplished by computer vision monitoring of real-time airport video and detecting trained scenarios, e.g., catering has not arrived at the aircraft or fueling has started/ended. In several example embodiments, once these scenarios are detected, the machine learning models send alerts to employees and other downline systems.

In several example embodiments, the materials for the system 10 may include frameworks, such as Tensorflow, Caffe, and React Native, and may further include the Intel® Movidius™ Chip, IP Cameras, and programming languages, such as Python and Node.js.

In several example embodiments, the system 10 and/or the execution of at least a portion of the method 400 provide aircraft departure readiness and on-time schedules.

In several example embodiments, the system 10 and/or the execution of at least a portion of the method 400 provides improved departure readiness through automation using computer vision and AI.

In several example embodiments, the system 10 includes a computer vision-based tool that utilizes machine learning, artificial intelligence, and the enterprise camera system (e.g., cameras 25-25f) to capture accurate results of activities around the aircraft. By utilizing the system 10, the reporting of tasks is automated, thereby reducing error rates, improving timeliness of data, and allowing inference of new data elements to drive timely decisions and mitigate costly flight customer experience failures. In several example embodiments, the system 10 is executed by the machine learning processing server, the desktop application, the mobile application, one or more of the downline systems, or any combination thereof.

In several example embodiments, the operation of the system 10 results in alarms, messages, data streams, etc., which update critical operational departments, such as the tower and the control center, in the event details section of, for example, a downline system such as Ground Event Tracker (GET), without waiting for untimely, manual reporting processes to be completed.

In several example embodiments and as detailed above, the operation of the combination of the IP cameras and the application 15 executed on the machine learning processing server results in the recognition that an object should not be in the safety zone 85, and the transmission of one or more alert signals to a downline system to report the unsafe situation and stop an unsafe operation. For example, in an example embodiment, the machine learning processing server 30 and/or the application 15 may send an alert to a downline system such as a visual docking guidance system (DGS) available from, for example, ADB SAFETYGATE. As a result of the transmission of the alert, the DGS may prevent the aircraft 80 from moving into the safety zone 85, or further into the safety zone 85, and/or the jet bridge 60 may be prevented from being attached to, or detached from, the aircraft 80.

In some embodiments, carry-on luggage 100 includes any type of: baggage, luggage, suitcase, bag, gear, belonging, purse, satchel, computer case, briefcase, and the like, wheeled or not wheeled, that the passenger intends to bring in the cabin of the aircraft 80.

In several example embodiments, the operation of the system 10 allows a commercial airline to track variances in activities. For example, the system 10 detects that fueling activities have not yet begun and sends a message to the fuel team that fueling of the aircraft is required.

In several example embodiments, the screen 75 and specifically the line 140 that extends parallel to the gate axis 125 and is positioned perpendicular to the time axis 130 at a position representing the current time allows the user 70 to monitor and anticipate gate congestion at the terminal 50 because the status of turnaround activities at each gate is displayed relative to the current time and relative to other time periods. This combination of elements allows for more efficient and accurate identification of projected gate congestion and/or turnaround delays, which allows for more efficient and accurate mitigation of gate congestion.

In several example embodiments, the system 10 assigns a delay to a certain team or group, based on the detection of actual start time(s) and/or actual end time(s). For example, if the Ramp Control team is late and the actual start time of the activities for which the Ramp Control team is responsible is 10 minutes late, as detected by the system 10, the system assigns a 10-minute delay charge to the Ramp Control team. In an example embodiment, the system 10 so assigns the delay charge by sending a message to a downline system, which assigns the delay charge.

In several example embodiments, the system 10 assigns a delay to a certain team or group, based on the detection of actual start time(s) and/or actual end time(s). For example, if the fuel team is late and the actual start time of the fueling activities is 10 minutes late, as detected by the system 10, the system assigns a 10-minute delay charge to the fuel team. In an example embodiment, the system 10 so assigns the delay charge by sending a message to a downline system, which assigns the delay charge.

In several example embodiments, the system 10 employs neural networks and/or deep learning to, for example, train the models to assist in detecting/identifying activities on the tarmac or in the gate 55a.

In some embodiments and using the system 10, the self-reported status reports are no longer needed, which eliminates the need for the dispatch, receipt, and storage of any self-reported status reports by the system 10. In some embodiments, a portion of the application 15 is stored in the server 30 and the server 30 sends the alerts and compares aspect(s) of the activity with the predetermined schedule. As such, the amount of computer processing and computer memory required by the computer 20 is reduced. The required amount of computer processing and computer memory required by the server 30 is reduced as the server 30 is not required to receive, decipher, and otherwise self-reported statuses from multiple users/entities. Thus, the system 10 and/or the method 400 involve a practical application of monitoring gate activities and providing alerts to relevant parties. Moreover, the system 10 and/or the method 400 are an improvement to the technical field of gate turnaround management.

Moreover, the server 30 and/or the application 15 automatically provide an update to the downstream applications in compatible format. In several example embodiments, execution of one or more steps of the method 400 enables a sector manager (or other personnel) to avoid manually updating multiple downstream applications. Instead, in several example embodiments, execution of one or more steps of the method 400 results in the continuous and automatic update of all of the airline flights schedules, gate schedules, and crew schedules, and the automatic and immediate capture or identification of problem gate turnarounds. As such, the displays on screens 75 and/or 480 and or the application 15 improves the functioning of the computer 20. That is, the requirement for displaying a user login screen and sub screens and/or file folders of an application within the one or more applications 35 on the output device 20*f* and inputting login information and searching commands is eliminated, reduces the processing load compared to the computer 20 needing to present login screens and sub screens and/or file folders and receiving input commands relating to the searching. Reducing the processing load of the computer 20 generally improves the performance of the computer 20 such that the available memory of the computer 20 is increased, the processing capacity of the computer 20 is increased therefore making the computer 20 operate more efficiently, and the processing speed of the computer 20 is increased. Thus, the Vigilant application 15 improves the functioning of the computer 20 itself. That is, the system 10 results in specific improvements in computer capabilities (i.e., reduction of required memory and reduction of processing load).

In several example embodiments, the system 10 includes such a large quantity of IP cameras, with IP camera(s) being located in the vicinity of each safety zone, gate, jet bridge, or any combination thereof, of an airline terminal or airport, that there is no need for human visualization of the airline terminal 50 or the airport 45. Accordingly, in several example embodiments, personnel monitoring the airline terminal 50 or the airport 45 do not need to be positioned in towers that provide vantage points for human visualization of the airline terminal or airport.

Figure 25:
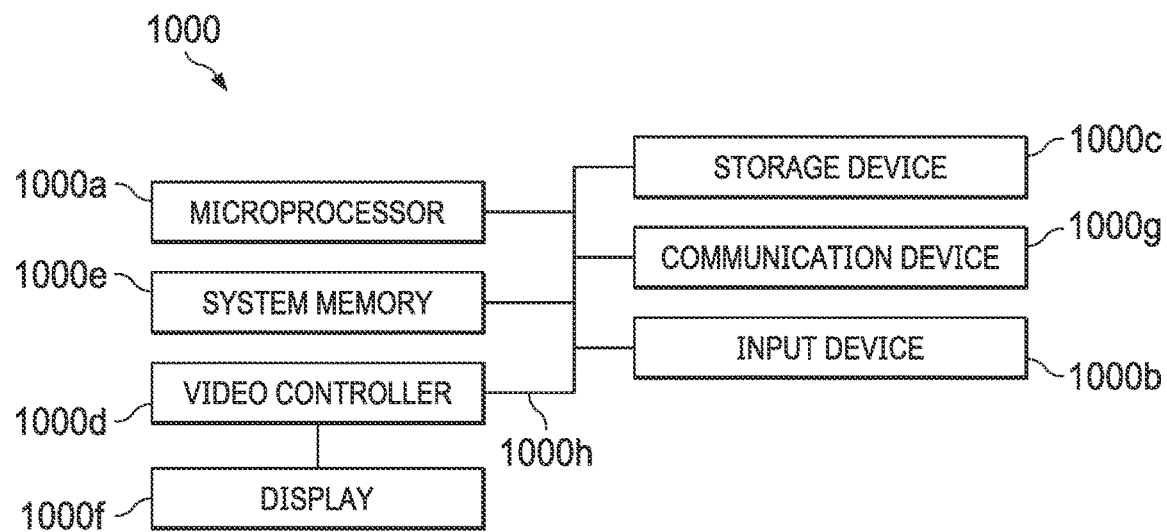
FIG. 25 is a diagrammatic illustration of a computing device, or node, for implementing one or more example embodiments of the present disclosure, according to an example embodiment.

In an example embodiment, as illustrated in FIG. 25 with continuing reference to FIGS. 1-3, 4A, 4B, and 5-24, an illustrative node 1000 for implementing one or more of the example embodiments described above and/or illustrated in FIGS. 1-3, 4A, 4B, and 5-24 is depicted. The node 1000 includes a microprocessor 1000*a*, an input device 1000*b*, a storage device 1000*c*, a video controller 1000*d*, a system memory 1000*e*, a display 1000*f*, and a communication device 1000*g* all interconnected by one or more buses 1000*h*. In several example embodiments, the storage device 1000*c* may include a floppy drive, hard drive, CD-ROM, optical drive, any other form of storage device and/or any combination thereof. In several example embodiments, the storage device 1000*c* may include, and/or be capable of receiving, a floppy disk, CD-ROM, DVD-ROM, or any other form of computer-readable medium that may contain executable instructions. In several example embodiments, the communication device 1000*g* may include a modem, network card, or any other device to enable the node to communicate with other nodes. In several example embodiments, any node represents a plurality of interconnected (whether by intranet or Internet) computer systems, including without limitation, personal computers, mainframes, PDAs, smartphones and cell phones.

In several example embodiments, one or more of the components of the systems described above and/or illustrated in FIGS. 1-3, 4A, 4B, and 5-24 include at least the node 1000 and/or components thereof, and/or one or more nodes that are substantially similar to the node 1000 and/or components thereof. In several example embodiments, one or more of the above-described components of the node 1000, the system 10, and/or the example embodiments described above and/or illustrated in FIGS. 1-3, 4A, 4B, and 5-24 include respective pluralities of same components.

In several example embodiments, one or more of the applications, systems, and application programs described above and/or illustrated in FIGS. 1-3, 4A, 4B, and 5-24 include a computer program that includes a plurality of instructions, data, and/or any combination thereof; an application written in, for example, Arena, HyperText Markup Language (HTML), Cascading Style Sheets (CSS), JavaScript, Extensible Markup Language (XML), asynchronous Javascript and XML (Ajax), and/or any combination thereof; a web-based application written in, for example, Java or Adobe Flex, which in several example embodiments pulls real-time information from one or more servers, automatically refreshing with latest information at a predetermined time increment; or any combination thereof.

In several example embodiments, a computer system typically includes at least hardware capable of executing machine readable instructions, as well as the software for executing acts (typically machine-readable instructions) that produce a desired result. In several example embodiments, a computer system may include hybrids of hardware and software, as well as computer sub-systems.

In several example embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several example embodiments, hardware may include any physical device that is capable of storing machine-readable instructions, such as memory or other data storage devices. In several example embodiments, other forms of hardware include hardware sub-systems, including transfer devices such as modems, modem cards, ports, and port cards, for example.

In several example embodiments, software includes any machine code stored in any memory medium, such as RAM or ROM, and machine code stored on other devices (such as floppy disks, flash memory, or a CD ROM, for example). In several example embodiments, software may include source or object code. In several example embodiments, software encompasses any set of instructions capable of being executed on a node such as, for example, on a client machine or server.

In several example embodiments, combinations of software and hardware could also be used for providing enhanced functionality and performance for certain embodiments of the present disclosure. In an example embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several example embodiments, computer readable mediums include, for example, passive data storage, such as a random access memory (RAM) as well as semi-permanent data storage such as a compact disk read only memory (CD-ROM). One or more example embodiments of the present disclosure may be embodied in the RAM of a computer to transform a standard computer into a new specific computing machine. In several example embodiments, data structures are defined organizations of data that may enable an embodiment of the present disclosure. In an example embodiment, a data structure may provide an organization of data, or an organization of executable code.

In several example embodiments, any networks and/or one or more portions thereof may be designed to work on any specific architecture. In an example embodiment, one or more portions of any networks may be executed on a single computer, local area networks, client-server networks, wide area networks, internets, hand-held and other portable and wireless devices and networks.

In several example embodiments, a database may be any standard or proprietary database software. In several example embodiments, the database may have fields, records, data, and other database elements that may be associated through database specific software. In several example embodiments, data may be mapped. In several example embodiments, mapping is the process of associating one data entry with another data entry. In an example embodiment, the data contained in the location of a character file can be mapped to a field in a second table. In several example embodiments, the physical location of the database is not limiting, and the database may be distributed. In an example embodiment, the database may exist remotely from the server, and run on a separate platform. In an example embodiment, the database may be accessible across the Internet. In several example embodiments, more than one database may be implemented.

In several example embodiments, a plurality of instructions stored on a non-transitory computer readable medium having stored thereon a plurality of instructions computer readable medium may be executed by one or more processors to cause the one or more processors to carry out or implement in whole or in part the above-described operation of each of the above-described example embodiments of the system, the method, and/or any combination thereof. In several example embodiments, such a processor may include one or more of the microprocessor 1000a, any processor(s) that are part of the components of the system, and/or any combination thereof, and such a computer readable medium may be distributed among one or more components of the system. In several example embodiments, such a processor may execute the plurality of instructions in connection with a virtual computer system. In several example embodiments, such a plurality of instructions may communicate directly with the one or more processors, and/or may interact with one or more operating systems, middleware, firmware, other applications, and/or any combination thereof, to cause the one or more processors to execute the instructions.

It is understood that variations may be made in the foregoing without departing from the scope of the present disclosure. For example, instead of, or in addition to transportation transactions often conducted in the course of airline industry business, aspects of the present disclosure are applicable and/or readily adaptable to transportation transactions conducted in other industries, including rail, bus, cruise and other travel or shipping industries, rental car industries, hotels and other hospitality industries, entertainment industries, and other industries.

In one aspect, the disclosure provides a method of monitoring and reporting aircraft turnaround activities at an airport gate, the method comprising: monitoring the airport gate using a first camera that has a first field of view associated with the airport gate; generating, using the first camera, first image data capturing a first activity within the first field of view; receiving, by processor(s), the first image data; identifying, by the processor(s), the first activity captured in the first image data; comparing, using a computer application, aspect(s) of the first activity with a predetermined schedule; and displaying, on a graphical user interface remote from the first camera and using the computer application, an alert indicating that the first activity does not comply with the predetermined schedule; wherein the processor(s) include a machine learning processor. In one embodiment, the method also includes monitoring the airport gate using a second camera that has a second field of view associated with the airport gate; generating, using the second camera, second image data capturing the first activity within the second field of view; receiving, by the processor(s), the second image data; and identifying, by the processor(s), the first activity captured in the second image data; and wherein the identification of the first activity captured in the second image data confirms the identification of the first activity captured in the first image data. In one embodiment, the second camera is an infrared camera; and wherein the first camera is not an infrared camera. In one embodiment, the airport gate includes a portion of a terminal structure and a safety zone external to the terminal structure; wherein an aircraft is parked in the safety zone; and wherein the first activity is an activity that occurs within the safety zone. In one embodiment, the predetermined schedule includes a set of approved activities; wherein the method further comprises identifying, using the computer application, a first user that is associated with the first activity; wherein the alert includes an instruction to cease the first activity; and wherein the graphical user interface on which the alert is displayed is associated with the first user. In one embodiment, the predetermined schedule includes a target time associated with the first activity; wherein the aspect(s) include a time stamp associated with the first activity; wherein comparing aspect(s) of the first activity with the predetermined schedule comprises comparing the time stamp to the target time; and wherein the method further comprises: identifying, using the computer application, a first user that is associated with the first activity; and notifying the first user that the first activity is behind schedule when the time stamp is later than the target time by a threshold amount. In one embodiment, the predetermined schedule includes a target time associated with a second activity that is after the target time associated with the first activity; and wherein the method further comprises: identifying, using the computer application, a second user that is associated with the second activity; and notifying the second user that the first activity is behind schedule. In one embodiment, the predetermined schedule includes an available amount of bin space in an aircraft; wherein the first field of view of the first camera comprises a view of an interior portion of a terminal structure in which passengers pass through to board the aircraft; wherein the first activity is a passenger moving within the interior portion of the terminal structure while preparing to board the aircraft with carry-on luggage; where the method further comprises estimating, by the processor(s), a size of the carry-on luggage; wherein the aspect(s) include the size of the carry-on luggage; wherein comparing the aspect(s) of the first activity with the predetermined schedule comprises comparing the estimated size of the carry-on luggage with available bin space in the aircraft; and wherein the alert displayed indicates that there is no available bin space to a user positioned in the interior portion of the terminal structure. In one embodiment, the method also includes, after displaying the alert, preventing the carry-on luggage from entering a cabin of the aircraft. In one embodiment, the airport gate is one a plurality of airport gates; wherein the method further comprising displaying, in a timeline portion of the graphical user interface, a visual depiction of scheduled turnaround times for aircraft at the plurality of airport gates; and wherein the timeline portion comprises: a gate axis listing the plurality of airport gates; a time axis—perpendicular to the gate axis—that represents a period of time; a block positioned relative to the gate axis to be associated with the airport gate and extending along the time axis to represent the time during which the aircraft is scheduled for a turnaround at the airport gate; and a line that extends parallel to the gate axis and is positioned perpendicular to the time axis at a position representing a current time; wherein the alert comprises a visual indicator located within the block and is representative of the first activity. In one embodiment, the first activity is any one of: arrival of an aircraft at the airport gate; attaching a jet bridge to the aircraft; detaching the jet bridge from the aircraft; crew members deplaning the aircraft; crew member boarding the aircraft; passengers deplaning the aircraft; passengers boarding the aircraft; a cargo door of the aircraft opening; the cargo door closing; a baggage door of the aircraft opening; the baggage door closing; a catering truck arriving to the airport gate; the catering truck starting a catering task; the catering truck departing from the airport gate; a fuel truck arriving to the airport gate; the fuel truck starting a fueling task; and the fuel truck departing from the gate.

In another aspect, the disclosure provides a system for monitoring and reporting aircraft turnaround activities at an airport gate, the system comprising: a first camera having a first field of view associated with the airport gate; a user device comprising a graphical user interface; and a non-transitory computer readable medium having stored thereon a plurality of instructions, wherein the instructions are executed with processor(s) so that the following steps are executed: monitoring the airport gate using the first camera; generating, using the first camera, first image data capturing a first activity within the first field of view; receiving, by the processor(s), the first image data; identifying, by the processor(s), the first activity captured in the first image data; comparing aspect(s) of the first activity with a predetermined schedule; and displaying, on the graphical user interface that is remote from the first camera, an alert indicating that the first activity does not comply with the predetermined schedule; wherein the processor(s) includes a machine learning processor. In one embodiment, the system also includes a second camera that has a second field of view associated with the airport gate; wherein when the instructions are executed the following steps are also executed: monitoring the airport gate using the second camera; generating, using the second camera, second image data capturing the first activity within the second field of view; receiving, by the processor(s), the second image data; and identifying, by the processor(s), the first activity captured in the second image data; and wherein the identification of the first activity captured in the second image data confirms the identification of the first activity captured in the first image data. In one embodiment, the second camera is an infrared camera; and the first camera is not an infrared camera. In one embodiment, the airport gate includes a portion of a terminal structure and a safety zone external to the terminal structure; wherein an aircraft is parked in the safety zone; and wherein the first activity is an activity that occurs within the safety zone. In one embodiment, the predetermined schedule includes a set of approved activities; wherein when the instructions are executed the following step is also executed: identifying a first user that is associated with the first activity; wherein the alert includes an instruction to cease the first activity; and wherein the user device on which the alert is displayed using the graphical user interface is associated with the first user. In one embodiment, the predetermined schedule includes a target time associated with the first activity; wherein the aspect(s) include a time stamp associated with the first activity; wherein comparing aspect(s) of the first activity with the predetermined schedule comprises comparing the time stamp to the target time; and wherein when the instructions are executed the following steps are also executed: identifying a first user that is associated with the first activity; and notifying the first user that the first activity is behind schedule when the time stamp is later than the target time by a threshold amount. In one embodiment, the predetermined schedule includes a target time associated with a second activity that is after the target time associated with the first activity; and wherein when the instructions are executed the following steps are also executed: identifying a second user that is associated with the second activity; and notifying the second user that the first activity is behind schedule. In one embodiment, the predetermined schedule includes an available amount of bin space in an aircraft; wherein the first field of view of the first camera comprises a view of an interior portion of a terminal structure in which passengers pass through to board the aircraft; wherein the first activity is a passenger moving within the interior portion of the terminal structure while preparing to board the aircraft with carry-on luggage; wherein when the instructions are executed the following step is also executed: estimating, by the processor(s), a size of the carry-on luggage; wherein the aspect(s) include the size of the carry-on luggage; wherein comparing the aspect(s) of the first activity with the predetermined schedule comprises comparing the estimated size of the carry-on luggage with available bin space in the aircraft; and wherein the alert displayed indicates that there is no available bin space to a user positioned in the interior portion of the terminal structure. In one embodiment, the airport gate is one a plurality of airport gates; wherein when the instructions are executed the following step is also executed: displaying, in a timeline portion of the graphical user interface, a visual depiction of scheduled turnaround times for aircraft at the plurality of airport gates; and wherein the timeline portion comprises: a gate axis listing the plurality of airport gates; a time axis—perpendicular to the gate axis—that represents a period of time; a block positioned relative to the gate axis to be associated with the airport gate and extending along the time axis to represent the time during which the aircraft is scheduled for a turnaround at the airport gate; and a line that extends parallel to the gate axis and is positioned perpendicular to the time axis at a position representing a current time; wherein the alert comprises a visual indicator located within the block and is representative of the first activity. In one embodiment, the first activity is any one of: arrival of an aircraft at the airport gate; attaching a jet bridge to the aircraft; detaching the jet bridge from the aircraft; crew members deplaning the aircraft; crew member boarding the aircraft; passengers deplaning the aircraft; passengers boarding the aircraft; a cargo door of the aircraft opening; the cargo door closing; a baggage door of the aircraft opening; the baggage door closing; a catering truck arriving to the airport gate; the catering truck starting a catering task; the catering truck departing from the airport gate; a fuel truck arriving to the airport gate; the fuel truck starting a fueling task; and the fuel truck departing from the gate.

In several example embodiments, the elements and teachings of the various illustrative example embodiments may be combined in whole or in part in some or all of the illustrative example embodiments. In addition, one or more of the elements and teachings of the various illustrative example embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down,"

etc., are for the purpose of illustration only and do not limit the specific orientation or location of the structure described above.

In several example embodiments, while different steps, processes, and procedures are described as appearing as distinct acts, one or more of the steps, one or more of the processes, and/or one or more of the procedures may also be performed in different orders, simultaneously, and/or sequentially. In several example embodiments, the steps, processes and/or procedures may be merged into one or more steps, processes, and/or procedures.

In several example embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

The phrase "at least one of A and B" should be understood to mean "A, B, or both A and B." The phrase "one or more of the following: A, B, and C" should be understood to mean "A, B, C, A and B, B and C, A and C, or all three of A, B, and C." The phrase "one or more of A, B, and C" should be understood to mean "A, B, C, A and B, B and C, A and C, or all three of A, B, and C."

Although several example embodiments have been described in detail above, the embodiments described are examples only and are not limiting, and those skilled in the art will readily appreciate that many other modifications, changes, and/or substitutions are possible in the example embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112(f) for any limitations of any of the claims herein, except for those in which the claim expressly uses the word "means" together with an associated function.

What is claimed is:

1. A method of monitoring activities within a structure associated with a vehicle, the method comprising:
    monitoring an internal portion of the structure using a camera that has a field of view that includes the internal portion of the structure;
    generating, using the camera, image data capturing an object within the field of view;
        wherein the object is intended to be placed in the vehicle;
    receiving, by processor(s), the image data;
    identifying, by the processor(s), an aspect of the object captured in the image data;
    identifying, by the processor(s), remaining available space within the vehicle;
    comparing, using a computer application, the aspect of the object with the remaining available space within the vehicle;
    determining, based on the comparison and using the computer application, whether there is sufficient space in the vehicle for the object or insufficient space in the vehicle for the object;
    and either:
        updating, by the computer application, an amount of used space within the vehicle to include the aspect of the object if there is sufficient space in the vehicle for the object; or
        displaying, on a graphical user interface remote from the camera and using the computer application, an alert indicating that there is insufficient space in the vehicle if there is insufficient space in the vehicle for the object.

2. The method of claim 1,
    wherein the structure comprises an airport gate; and
    wherein the internal portion of the airport gate comprises an internal portion of a jet bridge.

3. The method of claim 2,
    wherein the vehicle is an aircraft comprising a cabin;
    wherein the remaining available space is associated with overhead bin space located within the cabin; and
    wherein the object is luggage configured to be placed in the overhead bin space.

4. The method of claim 1,
    wherein the vehicle is an aircraft comprising a cabin; and
    wherein the method further comprises:
        determining, based on the comparison, that there is insufficient space in the vehicle for the object; and
        preventing the object from entering the cabin of the aircraft.

5. The method of claim 4,
    wherein the aircraft further comprises a hold; and
    wherein the method further comprises:
        placing the object in the hold of the aircraft.

6. The method of claim 1,
    wherein the aspect of the object is an estimated size of the object;
    wherein the vehicle is a type of vehicle;
    wherein identifying, by the processor(s), the remaining available space within the vehicle comprises:
        identifying, by the processor(s), a total volume of storage space associated with the type of vehicle;
        identifying, by the processor(s), the amount of used space within the vehicle; and
        determining a difference between the total volume of storage space and the amount of used space to identify the remaining available space; and
    wherein comparing, using the computer application, the aspect of the object with the remaining available space in the vehicle comprises comparing the estimated size of the object with the remaining available space.

7. The method of claim 6, wherein the amount of used space within the vehicle comprises an amount of storage space that is currently vacant.

8. The method of claim 1,
    wherein the object comprises a number of object pieces;
    wherein the aspect of the object is a number representing the number of object pieces;
    wherein the vehicle is a type of vehicle;
    wherein the remaining available space associated with the vehicle comprises a remaining number of object pieces capable of being stored in the space;
    wherein identifying, by the processor(s), the remaining available space associated with the vehicle comprises:
        identifying, by the processor(s), a total number of object pieces capable of being stored in the space associated with the type of vehicle;
        identifying, by the processor(s), a total number of object pieces already associated with the space of the vehicle; and determining a difference between the total number of object pieces capable of being stored in the space and the total number of object pieces already associated with the space of the vehicle to identify the remaining number of object pieces capable of being stored in the space; and wherein comparing, using the computer application, the aspect of the object with the remaining available space in the vehicle comprises comparing the number of object pieces in the object with the remaining number of object pieces capable of being stored in the space.

9. The method of claim 8, wherein at least a portion of the total number of object pieces already associated with the space of the vehicle is not yet placed in the space of the vehicle.

10. The method of claim 1, wherein the graphical user interface is positioned in the internal portion of the structure.

11. A system for method of monitoring activities within a structure associated with a vehicle, the system comprising:
   a camera that has a field of view that includes an internal portion of the structure;
   a user device comprising a graphical user interface; and
   a non-transitory computer readable medium having stored thereon a plurality of instructions, wherein the instructions are executed with processor(s) so that the following steps are executed:
      monitoring the internal portion using the camera;
      generating, using the camera, image data capturing an object within the field of view;
         wherein the object is intended to be placed in the vehicle;
      receiving, by the processor(s), the image data;
      identifying, by the processor(s), an aspect of the object captured in the image data;
      identifying, by the processor(s), remaining available space within the vehicle;
      comparing, using a computer application, the aspect of the object with the remaining available space within the vehicle;
      determining, based on the comparison, whether there is sufficient space in the vehicle for the object or insufficient space in the vehicle for the object;
      and either:
         updating, by the computer application, an amount of used space within the vehicle to include the aspect of the object, if there is sufficient space in the vehicle for the object; or
         displaying, on a graphical user interface remote from the camera and using the computer application, an alert indicating that there is insufficient space in the vehicle, if there is insufficient space in the vehicle for the object.

12. The system of claim 11,
wherein the structure comprises an airport gate; and
wherein the internal portion of the airport gate comprises an internal portion of a jet bridge.

13. The system of claim 12,
wherein the vehicle is an aircraft comprising a cabin;
wherein the remaining available space is associated with overhead bin space located within the cabin; and
wherein the object is luggage configured to be placed in the overhead bin space.

14. The system of claim 11,
wherein the aspect of the object is an estimated size of the object;
wherein the vehicle is a type of vehicle;
wherein identifying, by the processor(s), the remaining available space within the vehicle comprises:
   identifying, by the processor(s), a total volume of storage space associated with the type of vehicle;
   identifying, by the processor(s), the amount of used space within the vehicle; and
   determining a difference between the total volume of storage space and the amount of used space to identify the remaining available space; and
wherein comparing, using the computer application, the aspect of the object with the remaining available space in the vehicle comprises comparing the estimated size of the object with the remaining available space.

15. The system of claim 14, wherein the amount of used space within the vehicle comprises an amount of storage space that is currently vacant.

16. The system of claim 11,
wherein the object comprises a number of object pieces;
wherein the aspect of the object is a number representing the number of object pieces;
wherein the vehicle is a type of vehicle;
wherein the remaining available space associated with the vehicle comprises a remaining number of object pieces capable of being stored in the space;
wherein identifying, by the processor(s), the remaining available space associated with the vehicle comprises:
   identifying, by the processor(s), a total number of object pieces capable of being stored in the space associated with the type of vehicle;
   identifying, by the processor(s), a total number of object pieces already associated with the space of the vehicle; and
   determining a difference between the total number of object pieces capable of being stored in the space and the total number of object pieces already associated with the space of the vehicle to identify the remaining number of object pieces capable of being stored in the space; and
wherein comparing, using the computer application, the aspect of the object with the remaining available space in the vehicle comprises comparing the number of object pieces in the object with the remaining number of object pieces capable of being stored in the space.

17. The system of claim 16, wherein at least a portion of the total number of object pieces already associated with the space of the vehicle is not yet placed in the space of the vehicle.

18. The system of claim 16,
wherein the vehicle is a type of aircraft;
wherein the object is carry-on luggage; and
wherein the total number of object pieces capable of being stored in the space associated with the type of vehicle is a total number of average-sized carry-ons capable of being stored in overhead bin space associated with the type of aircraft.

19. The system of claim 11, wherein the graphical user interface is located in the internal portion of the structure.

20. The system of claim 11, wherein the camera is configured to estimate dimensions and depths of the object.

* * * * *